(12) United States Patent  (10) Patent No.: US 8,314,773 B2
Low et al.  (45) Date of Patent: Nov. 20, 2012

(54) MOUSE HAVING AN OPTICALLY-BASED SCROLLING FEATURE

(75) Inventors: Wing Kong Low, Cupertino, CA (US);
Brian H. Berkeley, Saratoga, CA (US);
Benjamin Bendix Lyon, Kensington, CA (US)

(73) Assignee: Apple Inc., Cupertino, CA (US)

( * ) Notice: Subject to any disclaimer, the term of this patent is extended or adjusted under 35 U.S.C. 154(b) by 681 days.

(21) Appl. No.: 12/030,776

(22) Filed: Feb. 13, 2008

(65) Prior Publication Data

US 2008/0150898 A1 Jun. 26, 2008

Related U.S. Application Data

(62) Division of application No. 10/238,380, filed on Sep. 9, 2002, now Pat. No. 7,358,963.

(51) Int. Cl.
*G06F 3/033* (2006.01)
*G09G 5/08* (2006.01)

(52) U.S. Cl. .......................... 345/166; 345/173; 345/684

(58) Field of Classification Search .......... 345/156–158, 345/163–166, 173–175, 179, 684
See application file for complete search history.

(56) References Cited

U.S. PATENT DOCUMENTS

| 3,609,695 A | 9/1971 | Pirkle |
| 3,748,751 A | 7/1973 | Breglia et al. |
| 3,757,322 A | 9/1973 | Barkan et al. |
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,110,749 A | 8/1978 | Janko et al. |
| 4,146,924 A | 3/1979 | Birk et al. |
| 4,219,847 A | 8/1980 | Pinkney et al. |
| 4,264,903 A | 4/1981 | Bigelow |
| 4,303,856 A | 12/1981 | Serras-Paulet |
| 4,305,071 A | 12/1981 | Bell et al. |
| 4,305,131 A | 12/1981 | Best |
| 4,346,376 A | 8/1982 | Mallos |
| 4,375,674 A | 3/1983 | Thornton |
| 4,396,945 A | 8/1983 | DiMatteo et al. |
| 4,435,835 A | 3/1984 | Sakow et al. |
| 4,475,122 A | 10/1984 | Green |
| 4,484,179 A | 11/1984 | Kasday |
| 4,542,375 A | 9/1985 | Alles et al. |
| 4,561,017 A | 12/1985 | Greene |
| 4,613,942 A | 9/1986 | Chen |

(Continued)

FOREIGN PATENT DOCUMENTS

DE 4125049 1/1992

(Continued)

OTHER PUBLICATIONS

"Apple Unveils Optical Mouse and New Pro Keyboard," Press Release, Jul. 19, 2000.

(Continued)

*Primary Examiner* — Kimnhung Nguyen
(74) *Attorney, Agent, or Firm* — Morrison & Foerster LLP

(57) ABSTRACT

A peripheral input device for controlling movements on a display screen. The peripheral input device includes a housing and an optical touch pad carried by the housing. The optical touch pad is configured to translate finger motion into movements on the display screen.

36 Claims, 7 Drawing Sheets

U.S. PATENT DOCUMENTS

| | | |
|---|---|---|
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |
| 4,654,872 A | 3/1987 | Hisano et al. |
| 4,672,364 A | 6/1987 | Lucas |
| 4,686,374 A | 8/1987 | Liptay-Wagner et al. |
| 4,710,760 A | 12/1987 | Kasday |
| 4,719,524 A | 1/1988 | Morishima et al. |
| 4,736,191 A | 4/1988 | Matzke et al. |
| 4,746,770 A | 5/1988 | McAvinney |
| 4,772,028 A | 9/1988 | Rockhold et al. |
| 4,787,040 A | 11/1988 | Ames et al. |
| 4,853,888 A | 8/1989 | Lata et al. |
| 4,866,602 A | 9/1989 | Hall |
| 4,898,555 A | 2/1990 | Sampson |
| 4,917,516 A | 4/1990 | Retter |
| 4,922,236 A | 5/1990 | Heady |
| 4,948,371 A | 8/1990 | Hall |
| 4,988,981 A | 1/1991 | Zimmerman et al. |
| 4,993,806 A | 2/1991 | Clausen et al. |
| 5,045,843 A | 9/1991 | Hansen |
| 5,045,846 A | 9/1991 | Gay et al. |
| 5,072,294 A | 12/1991 | Engle |
| 5,125,077 A | 6/1992 | Hall |
| 5,153,829 A | 10/1992 | Furuya et al. |
| 5,168,531 A | 12/1992 | Sigel |
| 5,179,648 A | 1/1993 | Hauck |
| 5,186,646 A | 2/1993 | Pederson |
| 5,212,555 A | 5/1993 | Stoltz |
| 5,225,887 A | 7/1993 | Lipson et al. |
| 5,227,985 A | 7/1993 | DeMenthon |
| 5,237,311 A | 8/1993 | Mailey et al. |
| 5,252,951 A | 10/1993 | Tannenbaum et al. |
| 5,328,190 A | 7/1994 | Dart et al. |
| D349,280 S | 8/1994 | Kaneko |
| 5,339,213 A | 8/1994 | O'Callaghan |
| 5,341,133 A | 8/1994 | Savoy et al. |
| 5,355,148 A | 10/1994 | Anderson |
| 5,404,152 A | 4/1995 | Nagai |
| 5,412,189 A | 5/1995 | Cragun |
| 5,414,445 A | 5/1995 | Kaneko et al. |
| 5,418,760 A | 5/1995 | Kawashima et al. |
| 5,424,756 A | 6/1995 | Ho et al. |
| 5,438,331 A | 8/1995 | Gilligan et al. |
| D362,431 S | 9/1995 | Kaneko et al. |
| 5,459,793 A | 10/1995 | Naoi et al. |
| 5,473,343 A | 12/1995 | Kimmich et al. |
| 5,473,344 A | 12/1995 | Bacon et al. |
| 5,483,261 A | 1/1996 | Yasutake |
| 5,488,204 A | 1/1996 | Mead et al. |
| 5,489,940 A | 2/1996 | Richardson et al. |
| 5,495,269 A | 2/1996 | Elrod et al. |
| 5,495,566 A | 2/1996 | Kwatinetz |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,515,079 A | 5/1996 | Hauck |
| 5,528,265 A | 6/1996 | Harrison |
| 5,530,456 A | 6/1996 | Kokubo |
| 5,559,301 A | 9/1996 | Bryan, Jr. et al. |
| 5,559,943 A | 9/1996 | Cyr et al. |
| 5,561,445 A | 10/1996 | Miwa et al. |
| 5,565,887 A | 10/1996 | McCambridge et al. |
| 5,572,239 A | 11/1996 | Jaeger |
| 5,578,817 A | 11/1996 | Bidiville et al. |
| 5,585,823 A | 12/1996 | Duchon et al. |
| 5,594,469 A | 1/1997 | Freeman et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,913 A | 3/1997 | Ikematsu et al. |
| 5,649,706 A | 7/1997 | Treat, Jr. et al. |
| D382,550 S | 8/1997 | Kaneko et al. |
| 5,661,505 A | 8/1997 | Livits |
| D385,542 S | 10/1997 | Kaneko et al. |
| 5,686,720 A | 11/1997 | Tullis |
| 5,709,219 A | 1/1998 | Chen et al. |
| 5,712,661 A | 1/1998 | Jaeger |
| 5,726,685 A | 3/1998 | Kuth et al. |
| 5,726,687 A | 3/1998 | Belfiore et al. |
| 5,729,219 A | 3/1998 | Armstrong et al. |
| 5,729,249 A | 3/1998 | Yasutake |
| 5,730,165 A | 3/1998 | Philipp |
| 5,736,975 A | 4/1998 | Lunetta |
| 5,748,185 A | 5/1998 | Stephan et al. |
| 5,751,274 A | 5/1998 | Davis |
| 5,754,890 A | 5/1998 | Holmdahl et al. |
| 5,777,603 A | 7/1998 | Jaeger |
| 5,786,804 A | 7/1998 | Gordon |
| 5,786,818 A | 7/1998 | Brewer et al. |
| 5,805,145 A | 9/1998 | Jaeger |
| 5,805,146 A | 9/1998 | Jaeger et al. |
| 5,808,602 A | 9/1998 | Sellers |
| 5,812,114 A | 9/1998 | Loop |
| 5,825,352 A | 10/1998 | Bisset et al. |
| 5,825,353 A | 10/1998 | Will |
| 5,828,364 A | 10/1998 | Siddiqui |
| 5,831,601 A | 11/1998 | Vogeley et al. |
| 5,835,079 A | 11/1998 | Shieh |
| 5,838,304 A | 11/1998 | Hall |
| 5,841,425 A | 11/1998 | Zenz |
| 5,841,426 A | 11/1998 | Dodson et al. |
| 5,841,428 A | 11/1998 | Jaeger et al. |
| D402,281 S | 12/1998 | Ledbetter et al. |
| 5,850,213 A | 12/1998 | Imai et al. |
| 5,856,822 A | 1/1999 | Du et al. |
| 5,859,631 A | 1/1999 | Bergman et al. |
| 5,867,149 A | 2/1999 | Jaeger |
| 5,871,251 A | 2/1999 | Welling et al. |
| 5,880,411 A | 3/1999 | Gillespie et al. |
| 5,883,619 A | 3/1999 | Hoe et al. |
| 5,889,236 A | 3/1999 | Gillespie et al. |
| 5,903,229 A | 5/1999 | Kishi |
| 5,907,152 A | 5/1999 | Dändliker et al. |
| 5,907,318 A | 5/1999 | Medina |
| 5,909,211 A | 6/1999 | Combs et al. |
| 5,914,706 A | 6/1999 | Kono |
| 5,923,319 A | 7/1999 | Bishop et al. |
| 5,933,134 A | 8/1999 | Shieh |
| 5,936,613 A | 8/1999 | Jaeger et al. |
| 5,949,345 A | 9/1999 | Beckert et al. |
| 5,956,019 A | 9/1999 | Bang et al. |
| 5,959,611 A | 9/1999 | Smailagic et al. |
| 5,977,867 A | 11/1999 | Blouin |
| 5,977,957 A | 11/1999 | Miller et al. |
| 5,982,302 A | 11/1999 | Ure |
| 5,982,352 A | 11/1999 | Pryor |
| 5,982,353 A | 11/1999 | Gallery et al. |
| 5,982,355 A | 11/1999 | Jaeger et al. |
| 5,991,431 A | 11/1999 | Borza et al. |
| 5,995,104 A | 11/1999 | Kataoka et al. |
| 5,999,166 A | 12/1999 | Rangan |
| 6,002,389 A | 12/1999 | Kasser et al. |
| 6,005,299 A | 12/1999 | Hengst |
| 6,005,611 A | 12/1999 | Gullichsen et al. |
| 6,008,800 A | 12/1999 | Pryor |
| 6,013,956 A | 1/2000 | Anderson, Jr. |
| 6,031,518 A | 2/2000 | Adams et al. |
| 6,049,328 A | 4/2000 | Vanderheiden |
| 6,054,990 A | 4/2000 | Tran |
| 6,057,540 A | 5/2000 | Gordon et al. |
| 6,061,177 A | 5/2000 | Fujimoto |
| 6,064,370 A | 5/2000 | Wang et al. |
| 6,066,075 A | 5/2000 | Poulton |
| 6,075,533 A | 6/2000 | Chang |
| 6,084,574 A | 7/2000 | Bidiville |
| 6,097,372 A | 8/2000 | Suzuki |
| 6,111,563 A | 8/2000 | Hines |
| 6,115,028 A | 9/2000 | Balakrishnan et al. |
| 6,124,587 A | 9/2000 | Bidiville et al. |
| 6,128,006 A | 10/2000 | Rosenberg et al. |
| 6,130,664 A | 10/2000 | Suzuki |
| 6,154,201 A | 11/2000 | Levin et al. |

| | | |
|---|---|---|
| 6,163,312 A | 12/2000 | Furuya |
| 6,166,721 A | 12/2000 | Kuroiwa et al. |
| 6,175,610 B1 | 1/2001 | Peter |
| 6,179,496 B1 | 1/2001 | Chou |
| 6,181,322 B1 | 1/2001 | Nanavati |
| 6,188,389 B1 | 2/2001 | Yen |
| 6,188,391 B1 | 2/2001 | Seely et al. |
| 6,188,393 B1 | 2/2001 | Shu |
| 6,191,774 B1 | 2/2001 | Schena et al. |
| 6,198,473 B1 | 3/2001 | Armstrong |
| 6,211,861 B1 | 4/2001 | Rosenberg et al. |
| 6,219,035 B1 | 4/2001 | Skog |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,232,957 B1 | 5/2001 | Hinckley |
| D443,616 S | 6/2001 | Fisher et al. |
| 6,243,078 B1 | 6/2001 | Rosenberg |
| 6,256,011 B1 | 7/2001 | Culver |
| 6,256,020 B1 | 7/2001 | Pabon et al. |
| 6,262,717 B1 | 7/2001 | Donohue et al. |
| 6,266,050 B1 | 7/2001 | Oh et al. |
| 6,278,441 B1 | 8/2001 | Gouzman et al. |
| 6,289,258 B1 | 9/2001 | Carter, Jr. et al. |
| 6,297,795 B1 | 10/2001 | Kato et al. |
| 6,323,843 B2 | 11/2001 | Giles et al. |
| 6,323,845 B1 | 11/2001 | Robbins |
| 6,323,846 B1 | 11/2001 | Westerman et al. |
| 6,326,956 B1 | 12/2001 | Jaeger et al. |
| 6,333,734 B1 | 12/2001 | Rein |
| 6,339,748 B1 | 1/2002 | Hiramatsu |
| 6,340,800 B1 | 1/2002 | Zhai et al. |
| D454,568 S | 3/2002 | Andre et al. |
| 6,356,524 B2 | 3/2002 | Aratani |
| 6,369,797 B1 | 4/2002 | Maynard |
| 6,373,470 B1 | 4/2002 | Andre et al. |
| 6,377,530 B1 | 4/2002 | Burrows |
| 6,392,632 B1 | 5/2002 | Lee |
| 6,392,634 B1 | 5/2002 | Bowers et al. |
| 6,392,636 B1 | 5/2002 | Ferrari et al. |
| 6,396,477 B1 | 5/2002 | Hinckley et al. |
| 6,412,961 B1 | 7/2002 | Hicks |
| 6,414,672 B2 | 7/2002 | Rekimoto et al. |
| 6,421,042 B1 | 7/2002 | Omura et al. |
| 6,421,046 B1 | 7/2002 | Edgren |
| 6,429,846 B2 | 8/2002 | Rosenberg et al. |
| 6,429,852 B1 | 8/2002 | Adams et al. |
| 6,433,780 B1 | 8/2002 | Gordon et al. |
| 6,441,806 B1 | 8/2002 | Jaeger |
| 6,441,807 B1 | 8/2002 | Yamaguchi |
| 6,457,834 B1 | 10/2002 | Cotton et al. |
| 6,469,693 B1 | 10/2002 | Chiang et al. |
| 6,478,432 B1 | 11/2002 | Dyner |
| 6,481,851 B1 | 11/2002 | McNelley et al. |
| 6,489,947 B2 | 12/2002 | Hesley et al. |
| 6,501,515 B1 | 12/2002 | Iwamura |
| 6,504,530 B1 | 1/2003 | Wilson et al. |
| 6,505,088 B1 | 1/2003 | Simkin et al. |
| 6,513,717 B2 | 2/2003 | Hannigan |
| 6,545,665 B2 | 4/2003 | Rodgers |
| 6,545,670 B1 | 4/2003 | Pryor |
| 6,559,830 B1 | 5/2003 | Hinckley et al. |
| 6,563,492 B1 | 5/2003 | Furuya |
| 6,570,584 B1 | 5/2003 | Cok et al. |
| 6,587,091 B2 | 7/2003 | Serpa |
| 6,587,093 B1 | 7/2003 | Shaw et al. |
| 6,611,252 B1 | 8/2003 | DuFaux |
| 6,636,197 B1 | 10/2003 | Goldenberg et al. |
| 6,639,584 B1 | 10/2003 | Li |
| 6,650,975 B2 | 11/2003 | Ruffner |
| 6,664,948 B2 * | 12/2003 | Crane et al. .................... 345/166 |
| 6,677,927 B1 | 1/2004 | Bruck et al. |
| 6,677,934 B1 | 1/2004 | Blanchard |
| 6,686,904 B1 | 2/2004 | Sherman et al. |
| 6,690,365 B2 * | 2/2004 | Hinckley et al. ............... 345/173 |
| 6,690,387 B2 | 2/2004 | Zimmerman et al. |
| 6,697,721 B2 | 2/2004 | Arlinsky |
| 6,700,564 B2 | 3/2004 | McLoone |
| 6,703,550 B2 | 3/2004 | Chu |
| 6,703,599 B1 | 3/2004 | Casebolt et al. |
| 6,707,027 B2 | 3/2004 | Liess et al. |
| 6,717,569 B1 | 4/2004 | Gruhl et al. |
| 6,724,366 B2 | 4/2004 | Crawford |
| 6,724,817 B1 | 4/2004 | Simpson et al. |
| 6,727,889 B2 | 4/2004 | Shaw |
| 6,738,045 B2 | 5/2004 | Hinckley et al. |
| 6,740,860 B2 | 5/2004 | Kobayashi |
| 6,762,751 B2 | 7/2004 | Kuan |
| 6,781,570 B1 * | 8/2004 | Arrigo et al. .................. 345/158 |
| 6,788,288 B2 | 9/2004 | Ano |
| 6,791,533 B2 | 9/2004 | Su |
| 6,795,056 B2 | 9/2004 | Norskog et al. |
| 6,795,057 B2 | 9/2004 | Gordon |
| 6,816,150 B2 | 11/2004 | Casebolt et al. |
| 6,828,958 B2 | 12/2004 | Davenport |
| 6,833,825 B1 | 12/2004 | Farag et al. |
| 6,844,871 B1 | 1/2005 | Hinckley et al. |
| 6,844,872 B1 | 1/2005 | Farag et al. |
| 6,848,014 B2 | 1/2005 | Landron et al. |
| 6,865,718 B2 | 3/2005 | Levi |
| 6,896,375 B2 | 5/2005 | Peterson et al. |
| 6,950,094 B2 | 9/2005 | Gordon et al. |
| 6,972,401 B2 | 12/2005 | Akitt et al. |
| 6,995,744 B1 | 2/2006 | Moore et al. |
| 7,002,749 B2 | 2/2006 | Kremen |
| 7,006,080 B2 | 2/2006 | Gettemy |
| 7,015,894 B2 | 3/2006 | Morohoshi |
| 7,030,861 B1 | 4/2006 | Westerman et al. |
| 7,046,230 B2 | 5/2006 | Zadesky et al. |
| 7,051,291 B2 | 5/2006 | Sciammarella et al. |
| 7,061,468 B2 * | 6/2006 | Tiphane et al. ................ 345/158 |
| 7,079,114 B1 | 7/2006 | Smith et al. |
| 7,084,859 B1 | 8/2006 | Pryor |
| 7,098,891 B1 | 8/2006 | Pryor |
| 7,113,196 B2 | 9/2006 | Kerr |
| 7,119,792 B1 | 10/2006 | Andre et al. |
| 7,136,045 B2 | 11/2006 | Rosenberg et al. |
| 7,142,193 B2 | 11/2006 | Hayama |
| 7,164,412 B2 | 1/2007 | Kao |
| 7,168,047 B1 | 1/2007 | Huppi |
| 7,170,488 B2 | 1/2007 | Kehlstadt et al. |
| 7,184,064 B2 | 2/2007 | Zimmerman et al. |
| 7,233,318 B1 | 6/2007 | Farag |
| 7,239,800 B2 | 7/2007 | Bilbrey |
| 7,358,963 B2 | 4/2008 | Low et al. |
| 7,397,464 B1 | 7/2008 | Robbins et al. |
| 7,417,681 B2 | 8/2008 | Lieberman et al. |
| 7,466,843 B2 | 12/2008 | Pryor |
| 7,489,303 B1 | 2/2009 | Pryor |
| 7,663,607 B2 | 2/2010 | Hotelling et al. |
| 7,675,504 B1 | 3/2010 | Smith et al. |
| 7,714,849 B2 | 5/2010 | Pryor |
| 7,970,870 B2 | 6/2011 | Hinckley et al. |
| 8,077,147 B2 | 12/2011 | Krah et al. |
| 2001/0011991 A1 | 8/2001 | Wang et al. |
| 2001/0012001 A1 | 8/2001 | Rekimoto et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0030665 A1 | 3/2002 | Ano |
| 2002/0030667 A1 * | 3/2002 | Hinckley et al. ............... 345/173 |
| 2002/0033848 A1 | 3/2002 | Sciammarella et al. |
| 2002/0063688 A1 | 5/2002 | Shaw et al. |
| 2002/0089545 A1 | 7/2002 | Levi |
| 2002/0093487 A1 | 7/2002 | Rosenberg |
| 2002/0118169 A1 | 8/2002 | Hinckley et al. |
| 2002/0118174 A1 | 8/2002 | Rodgers |
| 2002/0130839 A1 | 9/2002 | Wallace et al. |
| 2002/0130841 A1 | 9/2002 | Scott |
| 2002/0154090 A1 | 10/2002 | Lin |
| 2002/0158844 A1 | 10/2002 | McLoone |
| 2002/0164156 A1 | 11/2002 | Bilbrey |
| 2002/0180701 A1 | 12/2002 | Hayama |
| 2003/0001010 A1 | 1/2003 | Schmidt et al. |
| 2003/0002246 A1 | 1/2003 | Kerr |
| 2003/0038849 A1 | 2/2003 | Craven et al. |

| | | |
|---|---|---|
| 2003/0043121 A1 | 3/2003 | Chen |
| 2003/0050092 A1 | 3/2003 | Yun |
| 2003/0072077 A1 | 4/2003 | Peterson et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095096 A1 | 5/2003 | Robbin et al. |
| 2003/0098851 A1 | 5/2003 | Brink |
| 2003/0107551 A1 | 6/2003 | Dunker |
| 2003/0107552 A1 | 6/2003 | Lu |
| 2003/0184517 A1 | 10/2003 | Senzui et al. |
| 2004/0046741 A1 | 3/2004 | Low et al. |
| 2004/0113886 A1 | 6/2004 | Lee |
| 2004/0141157 A1 | 7/2004 | Ramachandran et al. |
| 2004/0156192 A1 | 8/2004 | Kerr et al. |
| 2004/0183782 A1 | 9/2004 | Shahoian et al. |
| 2004/0227739 A1 | 11/2004 | Tani et al. |
| 2004/0239622 A1 | 12/2004 | Proctor et al. |
| 2004/0242269 A1 | 12/2004 | Fadell |
| 2004/0252109 A1 | 12/2004 | Trent et al. |
| 2005/0064936 A1 | 3/2005 | Pryor |
| 2005/0084138 A1 | 4/2005 | Inkster et al. |
| 2005/0110768 A1 | 5/2005 | Marriott et al. |
| 2005/0122308 A1 | 6/2005 | Bell et al. |
| 2005/0134565 A1 | 6/2005 | Hong |
| 2005/0228320 A1 | 10/2005 | Klinghult |
| 2005/0259077 A1* | 11/2005 | Adams et al. ............... 345/163 |
| 2006/0026521 A1 | 2/2006 | Hotelling et al. |
| 2006/0026535 A1 | 2/2006 | Hotelling et al. |
| 2006/0047509 A1 | 3/2006 | Ding et al. |
| 2006/0161870 A1 | 7/2006 | Hotelling et al. |
| 2006/0197753 A1 | 9/2006 | Hotelling |
| 2006/0227099 A1 | 10/2006 | Han et al. |
| 2006/0274042 A1 | 12/2006 | Krah et al. |
| 2006/0284856 A1 | 12/2006 | Soss |
| 2007/0152966 A1 | 7/2007 | Krah et al. |
| 2007/0229424 A1 | 10/2007 | Hayashi et al. |
| 2007/0296688 A1 | 12/2007 | Nakamura et al. |
| 2008/0006762 A1 | 1/2008 | Fadell et al. |
| 2008/0018612 A1 | 1/2008 | Nakamura et al. |
| 2008/0024463 A1 | 1/2008 | Pryor |
| 2008/0029691 A1 | 2/2008 | Han |
| 2008/0088587 A1 | 4/2008 | Pryor |
| 2008/0129707 A1 | 6/2008 | Pryor |
| 2008/0211779 A1 | 9/2008 | Pryor |
| 2009/0027357 A1 | 1/2009 | Morrison |
| 2009/0128511 A1 | 5/2009 | Sinclair et al. |
| 2009/0267902 A1 | 10/2009 | Nambu et al. |
| 2009/0267921 A1 | 10/2009 | Pryor |
| 2009/0273563 A1 | 11/2009 | Pryor |
| 2009/0273574 A1 | 11/2009 | Pryor |
| 2009/0273575 A1 | 11/2009 | Pryor |
| 2009/0300531 A1 | 12/2009 | Pryor |
| 2009/0322499 A1 | 12/2009 | Pryor |
| 2010/0001978 A1 | 1/2010 | Lynch |
| 2010/0231506 A1 | 9/2010 | Pryor |
| 2012/0075255 A1 | 3/2012 | Krah |

FOREIGN PATENT DOCUMENTS

| | | |
|---|---|---|
| DE | 19722636 | 12/1998 |
| DE | 10022537 | 11/2000 |
| DE | 10201193 | 7/2003 |
| EP | 0 498 540 A2 | 1/1992 |
| EP | 0653725 | 5/1995 |
| EP | 0768619 | 4/1997 |
| EP | 0795837 | 9/1997 |
| EP | 0 880 091 A2 | 11/1998 |
| EP | 1 026 713 A1 | 8/2000 |
| EP | 1241558 | 9/2002 |
| GB | 2 435 369 A | 8/2007 |
| JP | 63-167923 A | 7/1988 |
| JP | 03/237520 | 10/1991 |
| JP | 05-297979 A | 11/1993 |
| JP | 7-230352 A | 8/1995 |
| JP | 07-319001 | 12/1995 |
| JP | 63106826 A | 5/1998 |
| JP | 10326149 A | 12/1998 |
| JP | 11-194863 | 7/1999 |
| JP | 11-194872 | 7/1999 |
| JP | 11-194883 | 7/1999 |
| JP | 2000/163031 A | 6/2000 |
| JP | 2000-215549 | 8/2000 |
| JP | 2000242424 | 9/2000 |
| JP | 2001-051790 | 2/2001 |
| JP | 2002/342033 A | 11/2002 |
| JP | 2003280807 | 2/2003 |
| JP | 2005-233679 A | 9/2005 |
| TW | 431607 | 4/2001 |
| WO | 90/05972 | 5/1990 |
| WO | 94/17494 | 8/1994 |
| WO | 98/14863 | 4/1998 |
| WO | 99/26330 | 5/1999 |
| WO | 99/49443 | 9/1999 |
| WO | 00/39907 | 7/2000 |
| WO | 02052494 | 7/2002 |
| WO | 03077110 | 9/2003 |
| WO | WO-2004/008081 A2 | 1/2004 |
| WO | WO-2004/091956 A2 | 10/2004 |
| WO | WO-2004/091956 A3 | 10/2004 |
| WO | WO-2005/026938 A2 | 3/2005 |
| WO | 2006/132817 | 12/2006 |
| WO | WO-2007/034591 A1 | 3/2007 |
| WO | WO-2007/035491 A1 | 3/2007 |
| WO | WO-2007/112742 A1 | 10/2007 |
| WO | WO-2008/045665 A1 | 4/2008 |
| WO | WO-2010/002900 A1 | 1/2010 |
| WO | WO-2010/135478 A2 | 11/2010 |

OTHER PUBLICATIONS

U.S. Appl. No. 29/231,465, filed Jun. 3, 2005.
"Logitech's MX Air is No Longer Vapor," Gizmodo Australia, retrieved from http://www.gizmodo.com.au/2007/07/logitechs_mx_air_is_no_longer.html on Jan. 11, 2008.
Marriott et al., U.S. Appl. No. 10/722,948, filed Nov. 25, 2003.
U.S. Appl. No. 10/060,712, filed Jan. 29, 2002.
U.S. Appl. No. 10/209,537, filed Jul. 30, 2002.
U.S. Appl. 10/654,108, filed Sep. 2, 2003.
"About Quicktip®" www.logicad3d.com/docs/qt.html, downloaded Apr. 8, 2002.
"Der Klangmeister," Connect Magazine, Aug. 1998.
"Neuros MP3 Digital Audio Computer", www.neurosaudio.com, downloaded Apr. 9, 2003.
"OEM Touchpad Modules" website www.giidepoint.com/sales/modules.index.shtml, downloaded Feb. 13, 2002.
"Product Overview—ErgoCommander®", www.logicad3d.com/products/ErgoCommander.htm, downloaded Apr. 8, 2002.
"Product Overview—SpaceMouse® Classic", www.logicad3d.com/products/Classic.htm, downloaded Apr. 8, 2002.
"Synaptics Tough Pad Interfacing Guide" Second Edition, Mar. 25, 1998, Synaptics, Inc. San Jose, CA, pp. 1 to 90.
"System Service and Troubleshooting Manual", www.dsplib.com/intv/Master, downloaded Dec. 11, 2002.
Apple Computer, Inc., "Apple Pro Mouse," Jul. 2000, Apple Pro Mouse Design Innovations product specification, pp. 1-11.
Bang & Olufsen Telecom a/s, "BeoCom 6000 User Guide 2000".
BeoCom 6000, Sales Training Brochure, date unknown.
Chapweske, Adam, "PS/2 Mouse/Keyboard Protocol", 1999, http://panda.cs.ndsu.nodak.edu/~achapwes/PICmicro/PS2/ps2.htm.
David Nagel, "More Details on the New Pro Keyboard and Button-Less Mouse," Jul. 2000, http://www.creativemac.com/HTM/News/07_00/detailskeyboardmouse.htm, pp. 1-2.
De Meyer, Kevin, Crystal Optical Mouse, Feb. 14, 2002, Heatseekerz, Web Article 19.
Dreier, Troy, "The Comfort Zone", PC Magazine, Mar. 12, 2002.
Fiore, Andrew, "Zen Touchpad", Cornell University, May 2000.
Flaminio, Michael, "IntelliMouse Explorer", IGM Review, Oct. 4, 1999.
Gadgetboy, "Point and click with the latest mice", CNETAsia Product Review, www.asia.cnet.com/reviews...are/gadgetboy/0,39001770,38023590,00.htm, downloaded Dec. 5, 2001.
Grevstad, Eric, "Microsoft Wireless IntelliMouse Explorer Review The Ultimate Pointing Machine", HardwareCentral Review, Jun. 24, 2003.

Grevstad, Eric, "Microsoft Wireless IntelliMouse Explorer Review The Ultimate Pointing Machine", HardwareCentral Review, Oct. 9, 2001.

John Siracusa, "MacWorld Expo NY 2000," Jul. 2000, http://www.arstechnic.com/wanderdesk/3q00/macworld2k/mwny-2.html, pp. 1-6.

Ken Hinckley et al. "Touch-Sensing Input Devices", CHI 1999 pp. 223-230.

Letter re: Bang & Olufsen A/S, by David Safran, Nixon Peabody, LLP, May 21, 2004.

Microsoft Inc., "Scroll and zoom on a Microsoft Excel sheet by using the Microsoft Intellimouse pointing device" 1999, pp. 1-3.

Photographs of Innovations 2000 Best of Show award presented at the 2000 International CES Innovations 2000 Design & Engineering Showcase, 1 pg.

Sylvania, "Intellivision™ Intelligent Television Master Component Service Manual," pp. 1, 2 and 8, 1979.

Tessler et al. "Touchpads Three new input devices", website www.macworld.com/1996/02/review/1806.html, download Feb. 13, 2002.

EPO Form 1507 dated Nov. 19, 2004 from EP Application No. 02761784.4.

International Search Report dated Jun. 12, 2007 from PCT Application No. PCT/US2006/020341.

Advisory Action dated Feb. 12, 2008 from U.S. Appl. No. 10/654,108.

Non-Final Office Action mailed Feb. 23, 2011, for U.S. Appl. No. 11/375,418, filed Mar. 13, 2006, 14 pages.

Bales, J.W. et al. (Apr. 1981). "Marking Parts to Aid Robot Vision," NASA Technical Paper 1819, 37 pages.

Bang & Olufsen Telecom a/s. (2000). "BeoCom 6000 User Guide and Sales Training Brochure Cover Sheets," 53 pages.

Final Office Action mailed Sep. 18, 2009, for U.S. Appl. No. 11/375,418, filed Mar. 13, 2006, 13 pages.

Final Office Action mailed Nov. 12, 2009, for U.S. Appl. No. 11/349,350, filed Feb. 8, 2006, nine pages.

Final Office Action mailed Aug. 10, 2010, for U.S. Appl. No. 11/375,418, filed Mar. 13, 2006, 13 pages.

Final Office Action mailed Sep. 2, 2010, for U.S. Appl. No. 11/272,868, filed Nov. 15, 2005, nine pages.

International Search Report mailed Aug. 28, 2007, for PCT Application No. PCT/US2004/009701, filed Mar. 31, 2004, one page.

International Search Report mailed Nov. 9, 2010, for PCT Application No. PCT/US2009/049270, 12 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Letter re: Bang & Olufsen a/s by David Safran, Nixon Peabody, LLP, May 21, 2004, with BeoCom 6000 Sales Training Brochure, seven pages.

Mehta, N. (Oct. 1982). "A Flexible Human Machine Interface," a Thesis Submitted in Conformity with the Requirements for the Degree of Master of Applied Science in the University of Toronto, 81 pages.

Non-Final Office Action mailed Jan. 6, 2009, for U.S. Appl. No. 11/349,350, filed Feb. 8, 2006, 10 pages.

Non-Final Office Action mailed Mar. 5, 2009, for U.S. Appl. No. 11/272,868, filed Nov. 15, 2005, 15 pages.

Non-Final Office Action mailed Mar. 5, 2009, for U.S. Appl. No. 11/375,418, filed Mar. 13, 2006, 21 pages.

Non-Final Office Action mailed Dec. 7, 2009, for U.S. Appl. No. 11/272,868, filed Nov. 15, 2005, seven pages.

Non-Final Office Action mailed Jan. 19, 2010, for U.S. Appl. No. 11/375,418, filed Mar. 13, 2006, 26 pages.

Non-Final Office Action mailed Jul. 29, 2010, for U.S. Appl. No. 11/980,721, filed Oct. 31, 2007, nine pages.

Non-Final Office Action mailed Aug. 2, 2010, for U.S. Appl. No. 11/980,722, filed Oct. 31, 2007, five pages.

Non-Final Office Action mailed Sep. 17, 2010, for U.S. Appl. No. 11/832,134, filed Aug. 1, 2007, 26 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

U.S. Appl. No. 11/272,868, filed Nov. 15, 2005, by Pryor.

U.S. Appl. No. 11/349,350, filed Feb. 8, 2006, by Pryor.

U.S. Appl. No. 11/878,024, filed Jul. 20, 2007, by Pryor.

U.S. Appl. No. 90/010,571, filed Jun. 10, 2009, by Pryor.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Mar. 9, 2011, for U.S. Appl. No. 11/980,722, filed Oct. 31, 2007, 11 pages.

Non-Final Office Action mailed Jul. 19, 2011, for U.S. Appl. No. 11/980,722, filed Oct. 31, 2007, 12 pages.

Final Office Action mailed Jul. 29, 2011, for U.S. Appl. No. 11/852,690, filed Sep. 10, 2007, 11 pages.

Final Office Action mailed Oct. 27, 2011, 2011, for U.S. Appl. No. 11/980,721, filed Oct. 31, 2007, 17 pages.

Final Office Action mailed Nov. 10, 2011, for U.S. Appl. No. 11/272,868, filed Nov. 15, 2005, nine pages.

Final Office Action mailed Nov. 18, 2011, for U.S. Appl. No. 11/878,024, filed Jul. 20, 2007, 18 pages.

Non-Final Office Action mailed Sep. 23, 2011, for U.S. Appl. No. 12/500,973, filed Jul. 10, 2009, five pages.

Non-Final Office Action mailed Dec. 8, 2011, for U.S. Appl. No. 12/500,925, filed Jul. 10, 2009, nine pages.

Non-Final Office Action mailed Dec. 9, 2011, for U.S. Appl. No. 12/500,984, filed Jul. 10, 2009, nine pages.

Non-Final Office Action mailed Dec. 12, 2011, for U.S. Appl. No. 12/500,951, filed Jul. 10, 2009, eight pages.

Non-Final Office Action mailed Dec. 16, 2011, for U.S. Appl. No. 12/500,978, filed Jul. 10, 2009, nine pages.

Non-Final Office Action mailed Sep. 30, 2011, for U.S. Appl. No. 12/468,401, filed May 19, 2009, 19 pages.

Non-Final Office Action mailed Oct. 31, 2011, for U.S. Appl. No. 12/167,237, filed Jul. 2, 2008, 17 pages.

Notice of Allowance mailed Aug. 12, 2011, for U.S. Appl. No. 11/375,418, filed Mar. 13, 2006, seven pages.

Final Office Action mailed Apr. 13, 2012, for U.S. Appl. No. 12/468,401, filed May 19, 2009, 21 pages.

Final Office Action mailed May 9, 2012, for U.S. Appl. No. 11/980,722, filed May 9, 2012, 14 pages.

Final Office Action mailed Jun. 8, 2012, for U.S. Appl. No. 12/167,237, filed Jul. 2, 2008, 21 pages.

Non-Final Office Action mailed May 2, 2012, for U.S. Appl. No. 11/832,134, filed Aug. 1, 2007, 25 pages.

Non-Final Office Action mailed May 23, 2012, for U.S. Appl. No. 13/310,511, filed Dec. 2, 2011, 10 pages.

Notice of Allowance mailed Mar. 26, 2012, for U.S. Appl. No. 12/500,973, filed Jul. 10, 2009, 12 pages.

* cited by examiner

MOUSE HAVING AN OPTICALLY-BASED SCROLLING FEATURE

CROSS-REFERENCE TO RELATED APPLICATION

This application is a divisional of and claims priority under 35 U.S.C. §120 to commonly owned and co-pending U.S. application Ser. No. 10/238,380, entitled "MOUSE HAVING AN OPTICALLY-BASED SCROLLING FEATURE," filed on Sep. 9, 2002, which is incorporated herein by reference in its entirety and for all purposes.

BACKGROUND OF THE INVENTION

1. Field of the Invention

The present invention relates generally to an input device for use in a computer system. More particularly, the present invention relates to a mouse having an optically-based scrolling feature.

2. Description of the Related Art

Most computer systems, as for example general purpose computers such as portable computers and desktop computers, receive input from a user via an input device such as a mouse. As is generally well known, the mouse allows a user to move an input pointer (e.g., cursor) and to make selections with respect to a graphical user interface (GUI) on a display screen. The mouse typically includes a trackball or optical sensor (located at the bottom side of the mouse) for translating the motion of the users hand into signals that the computer system can use. For example, by positioning the mouse on a desktop and moving it thereon, the user can move an input pointer or cursor in similar directions within the GUI. The mouse also conventionally includes one or more buttons, which are located on the top side of the mouse. These one or more buttons, when selected, can initiate a GUI action such as menu or object selections. The one or more buttons are typically provided by on or more button caps that move relative to the housing (e.g., through an opening in the housing).

Recently, a scroll wheel has been added to the mouse to give the user scrolling functionality. The scroll wheel saves time and steps, and allows a user to move through documents by physically rolling the wheel forward or backward-instead of clicking on the scroll bar displayed on the GUI. In the past, scrolling was implemented by selecting the scroll bar with the mouse, and moving the scroll bar on the GUI by moving the mouse up or down. A switch has also been incorporated into some mice for changing the mouse from a cursor control device to a scroll control device. In cursor control mode, mouse movements control cursor movements, and in scroll control mode, mouse movements control scroll movements. In most cases, the scroll wheel and switch require a separate mechanical component for actuating the scrolling feature. These devices also generally require the mechanical component to be mounted in the mouse with portions of it protruding out of the mouse housing to allow a user's finger access, i.e., the housing includes a cut out to allow the mechanical component to protrude therethrough.

Although mice designs such as those described above work well, there are continuing efforts to improve their form, feel and functionality. For example, it would be desirable to provide an improved scrolling feature for a mouse that is aesthetically pleasing to the user. As should be appreciated, the scroll wheel is not aesthetically pleasing since it protrudes above the mouse housing, i.e., breaks the surface of the mouse. Furthermore, the scroll wheel of the mouse can only be manipulated in one direction, and thus the use of the scroll wheel becomes counter intuitive when scrolling in a different direction in the GUI, as for example directions that are orthogonal thereto. In addition, it would be desirable to provide an improved scrolling feature for a mouse that allows the mouse to scroll directly without holding down or physically moving a wheel, button, switch or the like.

SUMMARY OF THE INVENTION

The invention relates, in one embodiment, to a peripheral input device for controlling movements on a display screen. The peripheral input device includes a housing and an optical touch pad carried by the housing. The optical touch pad is configured to translate finger motion into movements on the display screen.

The invention relates, in another embodiment, to a mouse having a finger actuated scrolling region that is integrated into a housing of the mouse. The scrolling region represents the working area of an optical system disposed inside the housing. The optical system is configured to detect finger movement across the scrolling region.

The invention relates, in another embodiment, to a mouse for use in a computer system having a display screen. The mouse includes a first position detection mechanism configured to track the position of a finger moving across an outer surface of the mouse and to generate signals for controlling movements on the display screen. The mouse also includes a second position detection mechanism configured to track the position of the mouse moving across a surface and to generate signals for controlling movements on the display screen.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
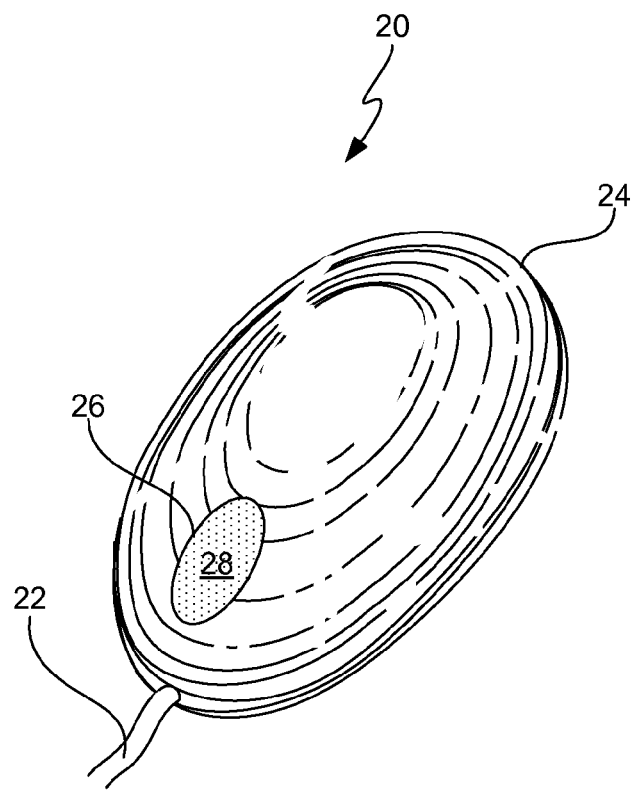
FIG. 1 is a perspective diagram of a peripheral input device, in accordance with one embodiment of the present invention.

FIG. 1 is a perspective diagram of a peripheral input device 20, in accordance with one embodiment of the invention. By peripheral input device 20, it is meant a device that is capable of connecting and sending information to a host system such as a computer system. As shown, the peripheral input device 20 includes a cable 22 for connecting to the host system. Alternatively, a radio frequency (RF) link or optical infrared (IR) link may be used in order to eliminate the cable. The peripheral input device 20 is generally configured to implement one or more tasks (e.g., specific functions) in the host system. For example, the peripheral input device may be used to control movements and/or perform actions on a display screen of the host system (e.g., via a graphical user interface).

The peripheral input device 20 shown in FIG. 1 includes a housing 24 that provides a structure for gripping the device during use thereof (e.g., handheld). The housing 24 also provides a structure for enclosing, containing and/or supporting the internal components of the peripheral input device 20. By way of example, the internal components may correspond to circuitry capable of processing/sending user inputs to the host system. The housing 24 also helps to define the shape or form of the peripheral input device 20. That is, the contour of the housing 24 embodies the outward physical appearance of the peripheral input device 20. The contour may be rectilinear, curvilinear or both.

The peripheral input device 20 generally includes a touch pad 26. The touch pad 26 is configured to provide positional data to the host system so as make movements on a display screen (e.g., via a graphical user interface). The positional data is generally produced when a hand or finger (or other object) is moved across the surface of the touch pad 26. By way of example, the positional data may be used to control the movement of a cursor/pointer on the display screen or to scroll or pan through the display screen. Additionally or alternatively, the optical touch pad 26 may provide command data to the host system so as implement tasks in the host system. The command data may be produced when a finger taps the surface of the touch pad 26. By way of example, the command data may be used to select an item on the screen, open a file or document, execute instructions, start a program, view a menu, and/or the like.

In one embodiment, the touch pad 26 corresponds to an optical touch pad. By optical touch pad, it is meant a touch pad that is based on optical technologies rather than conventional technologies such as capacitive technologies. The optical touch pad may be widely varied. For example, it may be a separate device that is positioned within the housing 24 or it may be an integrated device that uses a portion of the housing 24 to form the optical touch pad 26. In either case, the optical touch pad 26 generally includes an optically operable window and one or more optical sensors that monitor the position of a finger (or other object) as it is moved across the optically operable window, i.e., the sensors work through the optically operable window. By way of example, the optically operable window may be formed from a translucent or semi-translucent material. In the illustrated embodiment, the optical touch pad 26 is an integrated device such that the optical sensors are located within the housing 24, and at least a portion of the housing 24 serves as the optically operable window, i.e., the optical sensors work through a optically operable portion of the housing 24. The optically operable portions may form the entire housing 24 or only a small portion of the housing 24 (or anywhere therebetween). In one embodiment, the housing includes a top member and a bottom member, of which at least the entire top member serves as an optically operable window. The working area of the optical sensors generally defines one or more movement sensitive areas 28 within the optically operable window. By movement sensitive areas 28, it is meant the regions of the housing 24 that are used by a user to activate the optical touch pad 26 in order to implement actions (movements, commands) on the display screen. For example, by moving their finger over or on the region of the housing 24.

The optical sensors may be widely varied. For example, the optical sensors may correspond to camera like devices that capture images of the changing surface as the finger moves thereby or light detectors that measure the intensity of light reflecting off the finger as the finger moves over the surface of the housing. In each of these examples, the optical sensors are generally coupled to a controller that interprets the data collected by the optical sensors. For example, the controller may correspond to an application specific integrated circuit and/or a micro processor configured to compute the position, speed and direction of finger movement based on the signals produced by the optical sensors. The controller may also be configured to report this information to the host system.

The position of the movement sensitive areas 28 relative to the housing 24 may be widely varied. For example, the movement sensitive areas 28 may be positioned almost anywhere (e.g., top, side, front, or back) on the housing 24 so long as they are accessible to a user during manipulation of the device 20. In the illustrated embodiment, the movement sensitive areas 28 are positioned in middle front portion of the housing 24. This allows a user to actuate GUI movements by moving his/her index finger across the movement sensitive areas 28. As should be appreciated, the sides of the device 20 are generally gripped by the thumb and ring/pinky fingers. The number of movement sensitive areas 28 may also be widely varied. That is, although only one movement sensitive area 28 is shown in FIG. 1, it should be noted that a plurality of movement sensitive areas may be used. In addition, the shape of the movement areas may be widely varied. For example, they may be circles, triangles, squares, rectangles or any other known shape or they may be complex or random shapes such as an apple. In the illustrated embodiment, the movement area is shaped as an oval.

Although not shown, the peripheral input device 20 may also include one or more buttons that provide a clicking action for performing actions on the display screen. By way of example, the actions may include selecting an item on the screen, opening a file or document, executing instructions, starting a program, viewing a menu, and/or the like. The buttons may be widely varied. For example, the buttons may be mechanical buttons that are disposed through an opening in the housing 24 or a unified button/housing that incorporates the functionality of a button (or buttons) directly into the housing 24. The buttons of the peripheral input device 20 may also be a combination of the above (e.g., mechanical buttons and unified button housing). In the illustrated embodiment, the clicking action is provided by a unified button housing and thus there are no separate mechanical buttons. By way of example, a description of unified button housings may be found in commonly owned U.S. Pat. No. 6,373,470 and patent application Ser. No. 10/060,712, which are herein incorporated by reference.

Additionally, the peripheral input device 20 may include a position detection mechanism for performing additional movements on the display screen (e.g., by providing positional data to the host). Examples of position detection mechanisms, which may be used, are optical arrangements, trackball arrangements, joystick arrangements, touch pads arrangements and the like. The position detection mechanism may provide functionality similar to the touch pad 26. For example, the touch pad as well as the position detection mechanisms may be used to perform cursor movements or scroll movements. The position detection mechanism may also provide functionality that is different than the touch pad 26. For example, the touch pad 26 may provide scroll control while the position mechanism may provide cursor control. In cases such as this, the movement sensitive areas 28 of the touch pad 26 may be referred to as scrolling or panning regions.

In one embodiment, the position detection mechanism provides positional data corresponding to movements of the housing 24 when its moved across the surface (e.g., a desktop). By way of example, the position detection mechanism may correspond to a trackball or an optical sensor arrangement, both of which are commonly used in mice. In this embodiment, the housing 24 generally provides additional structure for moving the device 20 along a surface and for gripping the device 20 for movement thereof. Further, the position detection mechanism is generally positioned on the bottom side of the device (rather than on the top side where the touch pad, i.e., movement sensitive areas, are located). In one implementation, a bottom side of the housing has an external contour that substantially conforms to the contour of a flat surface such as a desktop and a top side of the housing has an external contour that substantially conforms to the contour of the inside surface of a hand.

Figure 2:
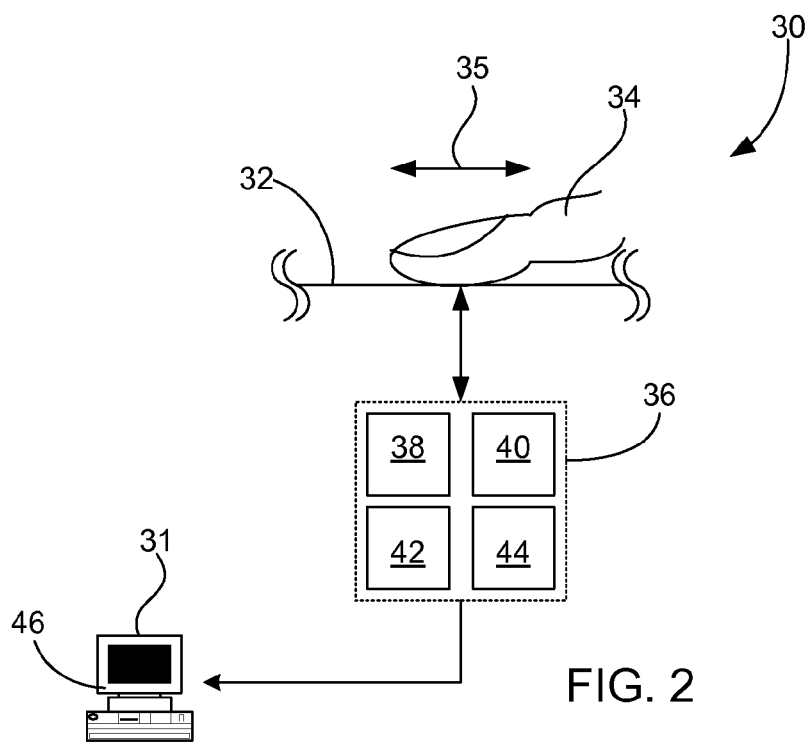
FIG. 2 is a simplified diagram of an optical touch pad, in accordance with one embodiment of the present invention.

FIG. 2 is a simplified diagram of an optical touch pad 30, in accordance with one embodiment of the present invention. The optical touch pad 30 may be a stand alone device or be integrated with other devices. For example, the optical touch pad 30 may be placed in an input device such as a keyboard, mouse or other peripheral input device such as the peripheral input device shown in FIG. 1. In addition, it may be placed in a portable device such as a laptop computer, cellular phone, media player, PDA or the like. In the illustrated embodiment, the optical touch pad 30 is part of a peripheral input device that is connected to a host system 31. By way of example, the host system may be a computer system such as a conventional computer system that includes a general purpose computer and a display.

As shown, the optical touch pad 30 includes an active surface 32 for receiving moving inputs from a finger 34. The moving inputs are shown by arrow 35. The active surface 32 is configured to cooperate with an optical assembly 36 that includes one or more optical sensors 38. The optical sensors 38 are configured to optically detect the position of the finger 34 as its moved over the active surface 32. The optical assembly 36 may also include one or more light sources 40 that cooperate with the one or more optical sensors 38, i.e., the light source 40 generates light that is used by the sensors 38 to process finger movements. The optical assembly 36 may also include one or more optical components 42 that help direct the light between the light source and the optical sensors. By way of example, the optical components may include lens, mirrors, prisms, and the like.

In general, when an object (e.g., finger 34) approaches the active surface 32, a position signal is generated by the optical sensors. Moreover, when an object is moved across the active surface 32, multiple position signals are generated by the optical sensors 38. The multiple position signals may be used to determine the direction, position, speed and acceleration of the object as its moved around the active surface 32. In one embodiment, the optical sensor 38 is a camera or image acquisition like device that takes multiple pictures of the finger as its moved and produces signals based on the changing pictures. For example, as the finger 34 is moved, the different pictures show the finger 34 at various points within the field of view of the camera. In this embodiment, the light source 40 serves to provide light in the field of view of the camera. In another embodiment, the optical sensor 38 is a plurality of light detectors, each of which measures the intensity of light as its reflected off the finger 34. The light is produced via the light source 40. Each finger position produces a different light intensity at each of the detectors and thus the finger position may be determined from the varying signals produced by the light detectors. In most cases, the spectrum of light outputted by the light source is balanced with the optical sensor, i.e., they are optically matched so as to provide a more efficient coupling between the light source and sensor.

The optical assembly may also include a control assembly 44 that interprets the data collected by the optical sensors 38. For example, the control assembly 44 may monitor the signals produced by the sensors 38 and compute the position, speed and direction of finger movement based on the processed signals. The control assembly 44 may also report this information to the host system 31 so that it can be used to move a cursor or scroll through a display screen 46. By way of example, the control assembly 44 may include an application specific integrated circuit and/or a processor. In one implementation, the application specific integrated circuit processes the data from the sensors and outputs quadrature signals based on the data to the processor, and the processor processes the quadrature signals and outputs positional data to a host device. For example, the processor may output the positional data (e.g., X and Y) via a universal serial bus (USB).

Although not shown, the optical assembly may also include a buzzer to provide audio feedback to a user. The audio feedback can, for example, be a clicking sound produced by the buzzer. In one embodiment, the buzzer is a piezo-electric buzzer. In most cases, the clicking sounds provide audio feedback to the user at the rate at which the finger is moved across the active surface. The number of clicking sounds per unit time increases the faster the movement, and the clicking sounds per unit time decreases the slower the movement. The buzzer is typically controlled by the control assembly.

Moreover, the active surface may include a tactile features, which provide tangible surfaces that help the user manipulate the touch pad. For example, the tactile feature may define the boundary of the active surface. The tactile features may be widely varied. For example, the tactile features may be bumps, lips, recesses, cavities and/or the like. The tactile features should be least obtrusive surface as possible while still allowing the user to feel or view the boundary. In most cases, the tactile features 62 are disposed around the outer periphery of the active surface. This configuration informs the user where the edge of the active surface is when using the touch pad. Alternatively, the boundary may be printed so that it is viewed rather than felt.

FIGS. 3A-3F are diagrams of a peripheral input device 50 being manipulated by a hand 52 of a user, in accordance with several embodiments of the present invention. By way of example, the peripheral input device 50 may generally correspond to the peripheral input device 20 shown in FIG. 1. The peripheral input device 50 is generally configured to provide both cursor and scroll control. In particular, movement of the peripheral input device 50 along a surface 54 controls the movement of a cursor, and movement of a finger 56 along the surface of the peripheral input device 50 controls a scrolling movement. As shown, the peripheral input device 50 includes an optical touch pad that is integrated into the top portion 58 of the housing 60 and a second position detection mechanism 62 that is positioned at the bottom portion 64 of the housing 60. The optical touch pad defines a scrolling region 66 on the housing 60 so as to allow a user to control scroll movements, i.e., movement of a finger thereover actuates scrolling on a display screen. The position detection mechanism 62, on the other hand, monitors the position of the housing 60 so as to allow a user to control cursor movements, i.e., movement of the housing over a surface actuates cursor movements on the display screen.

The term "scrolling" as used herein generally pertains to moving displayed data or images (e.g., text or graphics) across a viewing area on a display screen so that a new set of data or image (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, scrolling allows a user to view consecutive sets of data currently outside of the viewing area. The viewing area may be the entire viewing area of the display screen or it may only be a portion of the display screen (e.g., a window frame). By way of example, the scrolling may be used to help perform internet browsing, spreadsheet manipulation, viewing code, computer aided design, and the like.

In one embodiment, vertical scrolling is implemented when a finger is moved across the scrolling region in a first direction, as for example, from front to back or back to front. This particular embodiment is shown in FIGS. 3A-3D. In the case of vertical scrolling, when a user scrolls (or pans) down, each new set of data appears at the bottom of the viewing area and all other sets of data move up one position. If the viewing area is full, the top set of data moves out of the viewing area. Similarly, when a user scrolls (or pans) up, each new set of data appears at the top of the viewing area and all other sets of data move down one position. If the viewing area is full, the bottom set of data moves out of the viewing area. In another embodiment, horizontal scrolling is implemented when the finger is moved across the scrolling region in a second direction, as for example, from left to right or from right to left. This particular embodiment is shown in FIGS. 3E-3F. In the case of horizontal scrolling, when a user scrolls (or pans) to the side, each new set of data appears at the side of the viewing area and all other sets of data move to the side one position. If the viewing area is full, the outer most (right or left) set of data moves out of the viewing area. Similarly, when a user scrolls (or pans) to the opposite side, each new set of data appears at the side of the viewing area and all other sets of data move to the side one position. If the viewing area is full, the outer most set of data moves out of the viewing area. As should be appreciated, the above embodiments provide an intuitive way to scroll since the direction of the moving finger corresponds to the direction of scrolling.

Figures 3A, 3B:
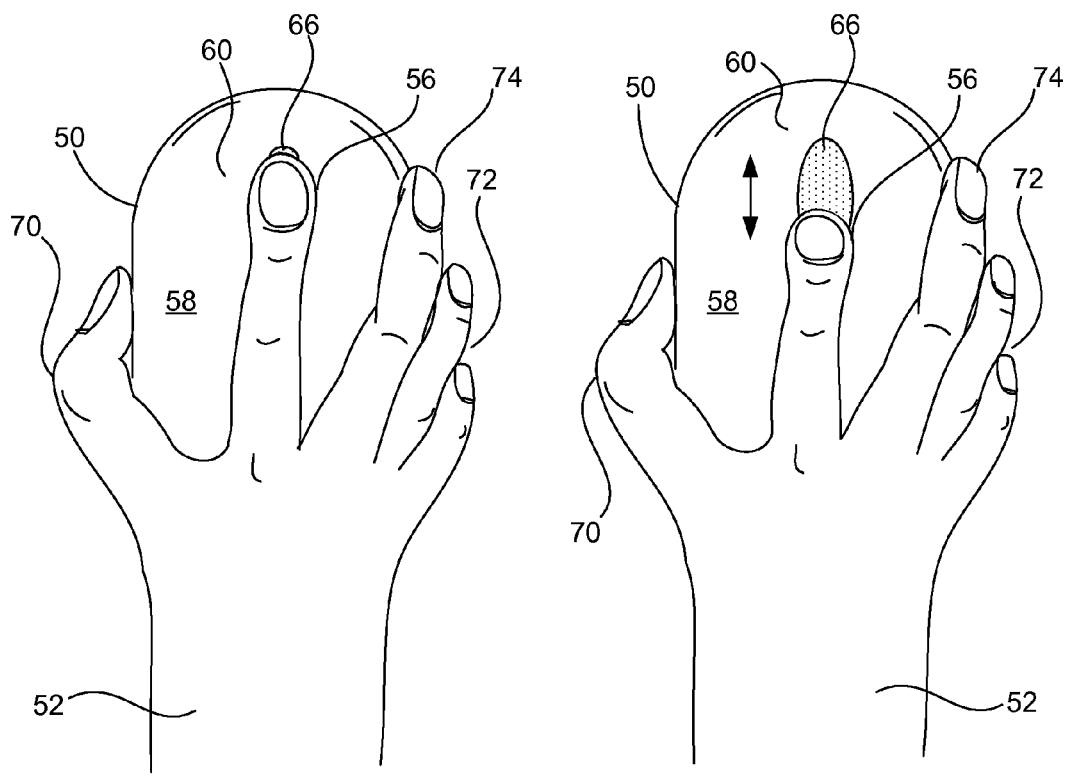
FIGS. 3A-3D show a peripheral input device in a vertical scrolling mode, in accordance with one embodiment of the present invention.
Figure 3C:
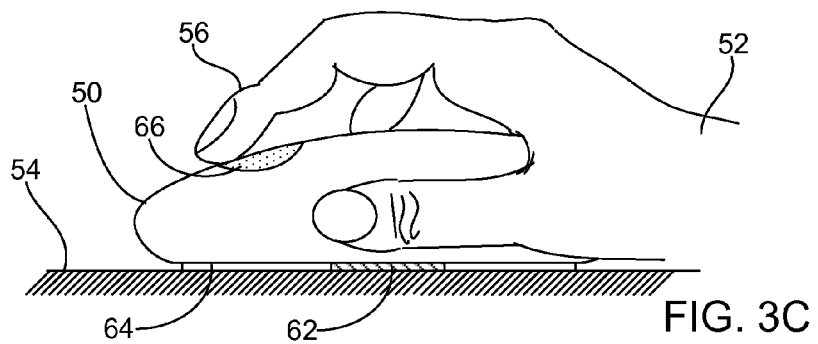
Figure 3D:
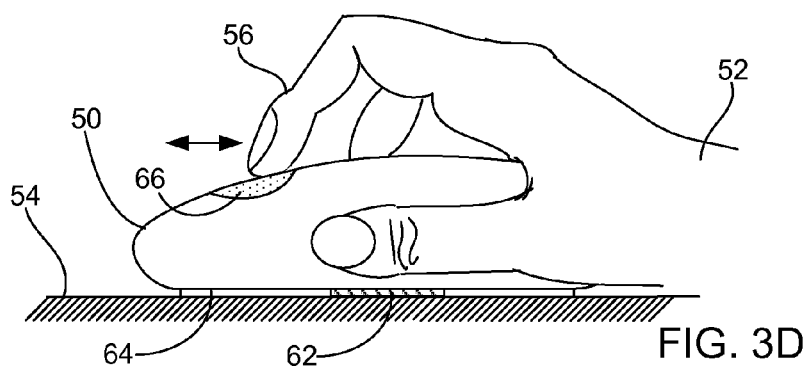
Figures 3E, 3F:
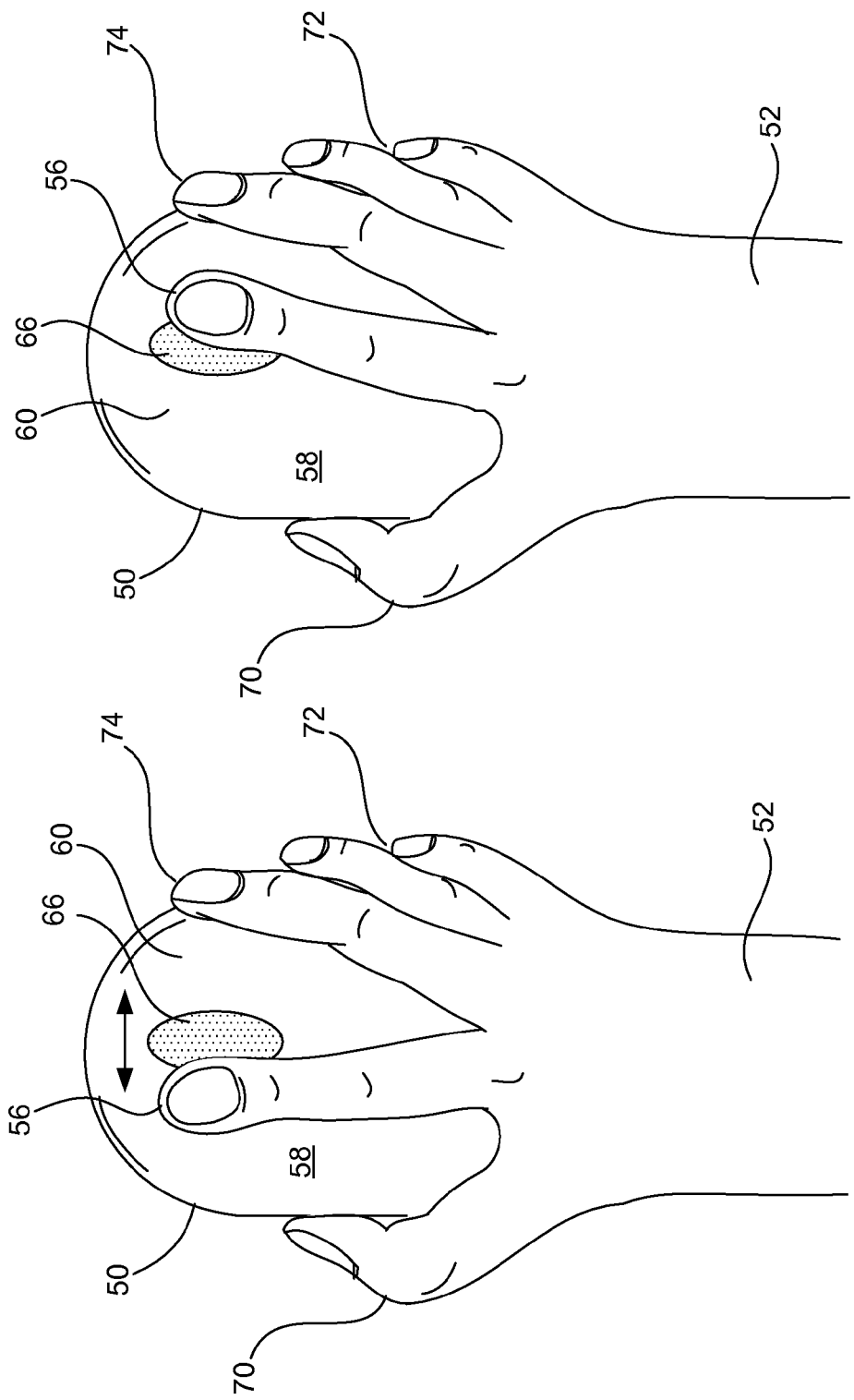
FIGS. 3E-3F show a peripheral input device in a horizontal scrolling mode, in accordance with one embodiment of the present invention.

Referring to FIGS. 3A-3D, the vertical scroll control mode of the peripheral input device 50 is actuated when the user's finger is moved between the front of the scroll region 66 (as shown in FIGS. 3A and 3C) and the back of the scroll region 66 (as shown in FIGS. 3B and 3D). To elaborate, the palm side surface of the hand 52 is placed on the back portion of the device 50 and the thumb 70 and two rightmost fingers 72 (or leftmost fingers if left handed) are used to grip the sides of the mouse. The two remaining fingers 56 and 74 (either by themselves or in combination) are used to manipulate the scrolling region 66 (and buttons if included on the mouse). In the illustrated embodiment, the index finger 56 is used to implement scrolling through the scrolling region 66. In this particular embodiment, upward vertical scrolling is implemented when the index finger 56 is moved forwards away from the hand 52, and downwards vertical scrolling is implemented when the index finger 56 is moved backwards towards the hand 52.

Referring to FIGS. 3E-3F, the horizontal scroll control mode of the device 50 is actuated when the user's finger 56 is moved between the left side of the scroll region 66 (as shown in FIG. 3E) and the right side of the scroll region 66 (as shown in FIG. 3F). To elaborate, the palm side surface of the hand 52 is placed on the back portion of the device 50 and the thumb 70 and two rightmost fingers 72 (or leftmost fingers if left handed) are used to grip the sides of the device 50. The two remaining fingers 56 and 74 (either by themselves or in combination) are used to manipulate the scrolling region 66 (and buttons if included on the mouse). In the illustrated embodiment, the index finger 56 is used to implement scrolling through the scrolling region 66. In this particular embodiment, upward vertical scrolling is implemented when the index finger is moved forwards away from the hand. In this particular embodiment, right vertical scrolling is implemented when the index finger 56 is moved sideways towards the other fingers, and left horizontal scrolling is implemented when the index finger 56 is moved sideways towards the thumb.

It should be noted that the hand positions shown in FIGS. 3A-3F are by way of example and not by way of limitation. That is, the hand positions may vary according to each device or user of the device. For example, the scrolling region may be located on a different area of the mouse, and thus different fingers may be used to actuate the scrolling region. Furthermore, it should be appreciated that any portion of the hand may be used to initiate the scrolling region regardless of the position of the scrolling region on the mouse. By way of example, any of the fingers, as well as palm or back side of the hand may be used to initiate the scrolling region.

Furthermore, it should also be noted that the scrolling region is shown by way of example and not limitation. That is, the scrolling region is not limited to only horizontal and vertical movements. For example, the scrolling region may correspond to a panning region or a second cursor control region, both of which allow other movements such as diagonal.

Figure 4:
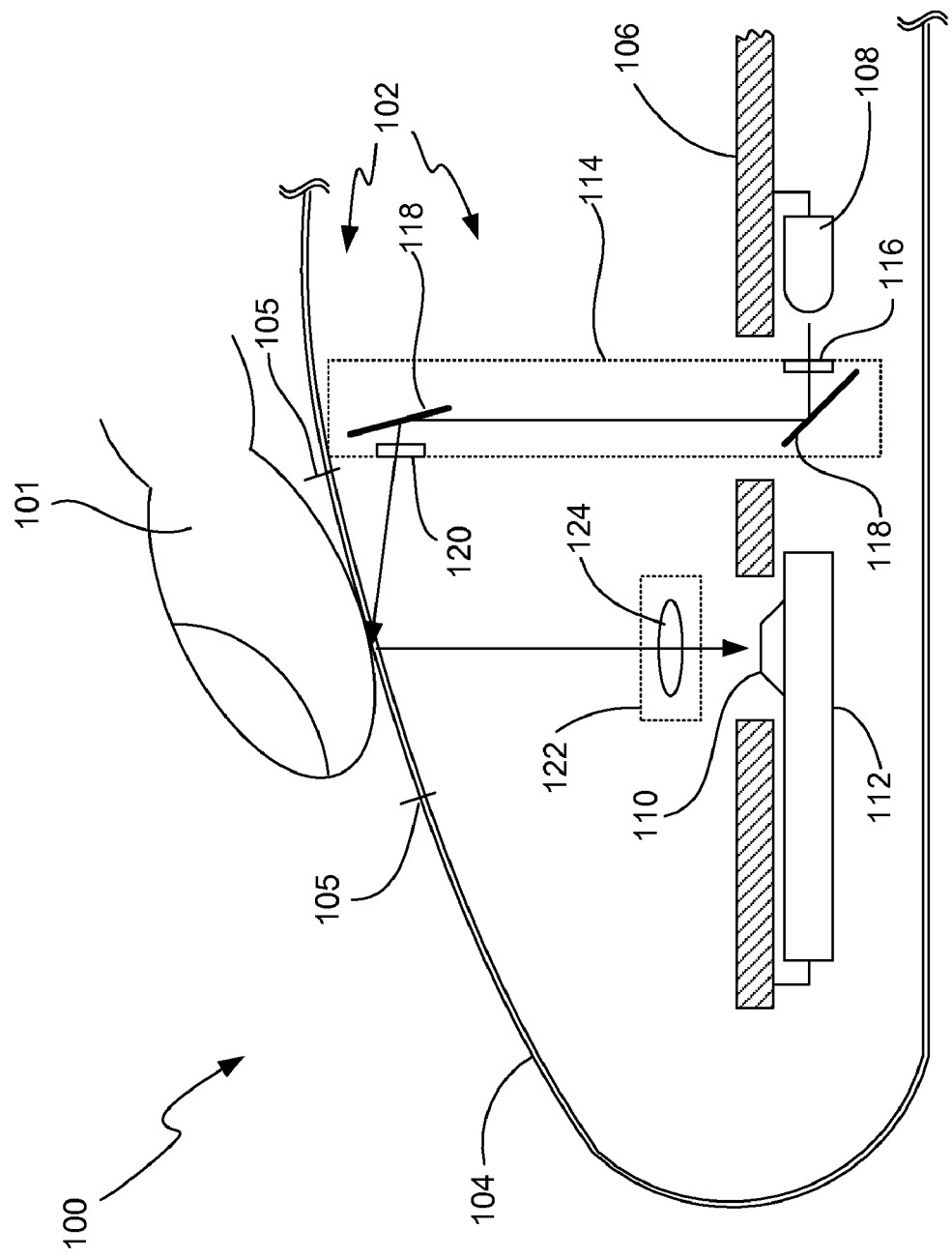
FIG. 4 is a broken away side view, in cross section, of a peripheral input device, in accordance with one embodiment of the present invention.

FIG. 4 is a broken away side view of a peripheral input device 100, in accordance with one embodiment of the present invention. By way of example, the peripheral input device 100 may generally correspond to any of the peripheral input devices shown herein. The peripheral input device 100 is configured with an optical touch pad 102 that is integrated directly with the housing 104 of the peripheral input device 100. By integrated directly, it is meant that the housing 104 serves as a portion of the optical touch pad 102. In the illustrated embodiment, the housing 104 serves as the operable optical window for the touch pad 102. The housing 104 is generally formed from a translucent or semi-translucent material that also provides strength and durability for protecting the internal components of the device 100. By way of example, the housing 104 may formed from a clear plastic material such as polycarbonate. Although a large portion of the housing 104 may be operable optically (e.g., translucent), the touch pad 102 generally defines a movement area 105 on the surface of the housing 104 for implementing GUI movements such as cursor or scroll movements. That is, the movement area 105 provides a boundary for forming the active portion of the touch pad 102.

As shown, the peripheral input device 100 includes a circuit board 106 to which the electronic components of the device are attached, as for example, the electronic components of the optical touch pad 102. The electronic components of the optical touch pad of FIG. 4 generally include a light source 108 and an image acquisition sensor 110 that work together to measure changes in finger position across the surface of the housing 104. In general, the light source 110 is configured to illuminate a portion of the housing 104, and the image acquisition sensor 110 is configured to acquire sequential surface images (e.g., multiple surface images per second) of the illuminated portion of the housing 104. In most cases, the illuminated area as well as the field of view of the image acquisition sensor 110 defines the movement area 105 of the touch pad 102. As should be appreciated, the image acquisition sensor 110 captures multiple images of the finger 101 as its moved across the movement area 105. These images may be used to determine the direction, position, speed, and acceleration of the moving (or stationary) finger. By way of example, the light source 108 may correspond to a light emitting diode (LED) such as a visible light LED or an infrared LED, and the image acquisition sensor 110 may correspond to a CMOS image sensor.

The image acquisition sensor 110 may be combined with other elements to form a bundled package. For example, it may be combined with elements that are configured to compare the most recent image to the past images to determine the direction, position, speed, and acceleration of finger movement, and/or elements that are configured to output this data to other devices. The elements may also be configured to drive the operation of the light source. By way of example, the image acquisition sensor may be operatively coupled to a microcontroller 112, which is capable of implementing those tasks. In one embodiment, the bundled image acquisition sensor corresponds to the HDNS-2000 or HDNS-2051 (or the like) Optical Mouse Sensors produced by Agilent of Palo Alto Calif. The HDNS-2000 Optical Mouse Sensor provides a non-mechanical tracking engine that measures changes in position by optically acquiring sequential surface images for 1500 times per second while mathematically determining the direction and magnitude of movement.

In order to effectively illuminate the housing 104, e.g., movement area 105, an optical system 114 may also be provided. The optical system 114 may be any device or devices that directs the light to the desired area. By way of example, the optical system 114 may correspond to a light conduit such as a light pipe or light guide or it may correspond to a combination of optical elements such as lens, mirrors, prisms and the like. In one embodiment, the optical system 114 is a specially designed optical component made in part with a light guiding material that directs light from the light source 108 to the housing 104.

In one implementation, the optical component 114 includes a light receiving area 116, one or more light directing areas 118, and a light output area 120. The light receiving area 116 is configured to transmit light from the light source 108 to the light directing areas 118. In most situations, the light receiving area 116 is positioned substantially adjacent to the light source 108 to efficiently couple light from the light source 108 to the light receiving area 116. The light directing areas 118 are arranged to direct the transmitted light from the light receiving area 116 to the light output area 120. The light output area 120 is positioned so as to direct light outward away from the optical component 114 and towards the housing 104 in the region of the movement areas 105. In this manner, when the light source 108 is transmitting light, the transmitted light illuminates the housing 104. In the illustrated embodiment, the optical system 114 is configured to direct the light from behind the PCB 106 where the light source 108 is located and onto the housing 104 in the region of the movement area 105. A second optical system 122 may be provided to help the image acquisition sensor 110 capture the image of the finger 101. For example, a lens 124 may be provided to focus the image onto the sensor 110. The first and second optical systems 114, 122 may be separate (as shown) or they may be combined into a single device.

Figure 5:
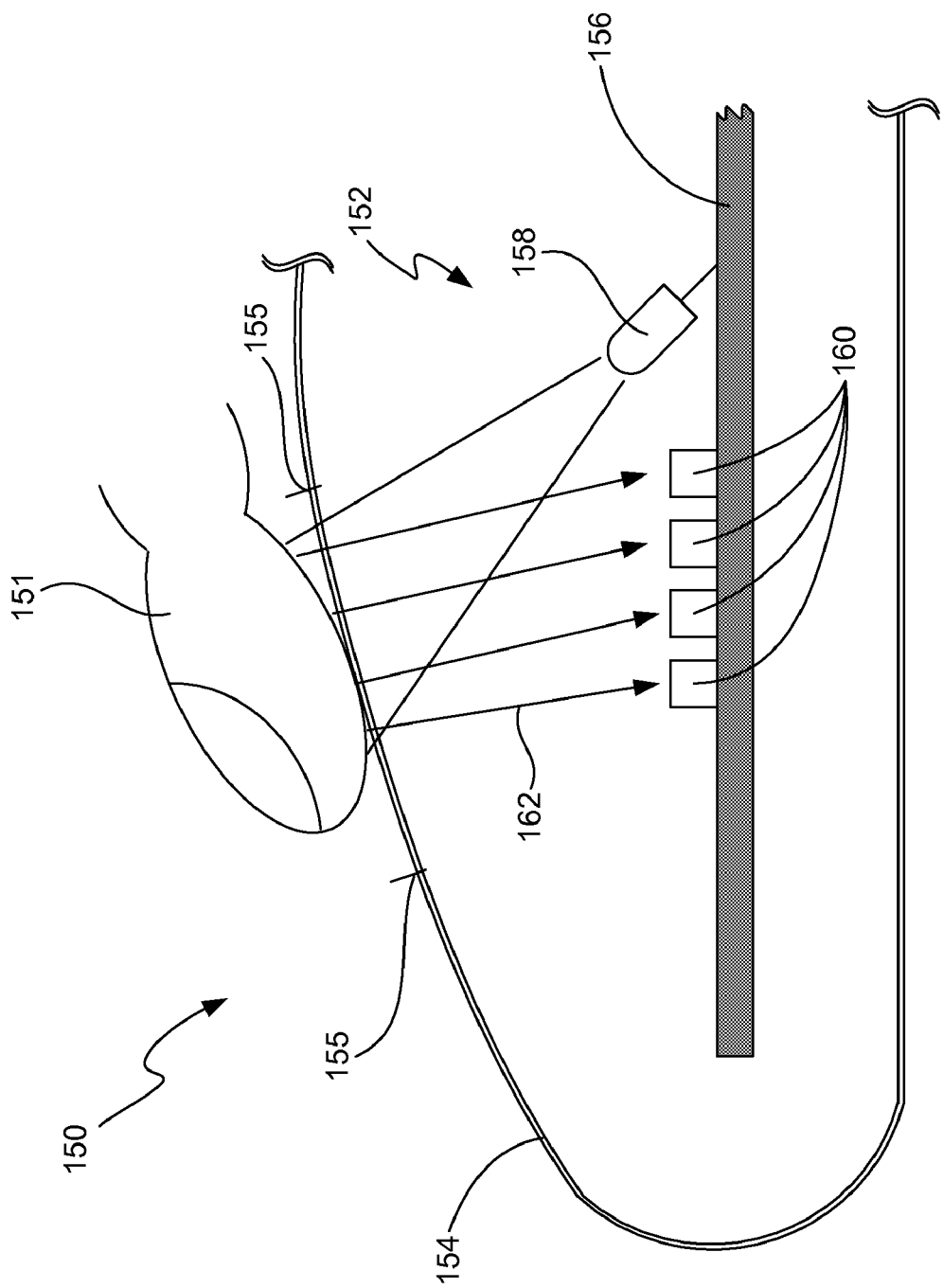
FIG. 5 is a broken away side view, in cross section, of a peripheral input device, in accordance with one embodiment of the present invention.

FIG. 5 is a broken away side view of a peripheral input device 150, in accordance with an alternate embodiment of the present invention. By way of example, the peripheral input device 150 may generally correspond to any of the peripheral input devices shown herein. The peripheral input device 150 is configured with an optical touch pad 152 that is integrated directly with the housing 154 of the peripheral input device 150. By integrated directly, it is meant that the housing 154 serves as a portion of the optical touch pad 152. In the illustrated embodiment, the housing 154 serves as the operable optical window for the touch pad 152. The housing 154 is generally formed from a translucent or semi-translucent material that also provides strength and durability for protecting the internal components of the device 150. By way of example, the housing 154 may formed from a clear plastic material such as polycarbonate. Although a large portion of the housing 154 may be operable optically (e.g., translucent), the touch pad 152 generally defines a movement area 155 on the surface for implementing GUI movements such as cursor or scroll movements. That is, the movement areas 155 provide a boundary for the active portion of the touch pad 152.

As shown, the peripheral input device 150 includes a circuit board 156 to which the electronic components of the device are attached, as for example, the electronic components of the optical touch pad 152. The electronic components of the optical touch pad of FIG. 5 generally include a light source or light emitter 158 and one or more light detectors 160 that work together to measure changes in finger position across the surface of the housing 154. The light emitter 158 is configured to shine light towards the housing 104 in the region of the movement area 155. The light detectors 160 are generally configured to measure the light intensity of the light 162 that is reflected off of the finger 151 when the finger 151 is positioned over the movement area 155. By way of example, the light source 108 may correspond to a I-R emitter diode and the light detectors 160 may correspond to I-R detectors.

Accordingly, when the finger 51 (or other object) is present as shown, the light 162 is reflected to the light detectors 160. That is, the light 162 passes through the housing 154, and hits the finger 151 thus causing the light 162 to be reflected back through the housing 154 and onto the detector 160. When the finger 151 is moved, the reflected light 162 changes at each of the detectors thus altering the intensity of light at the detectors. When a substantial amount of light 162 is reflected back to the detector 160, the detectors 160 produce signals that may be used to determine the direction, position, speed and acceleration of the finger movement.

Figure 6:
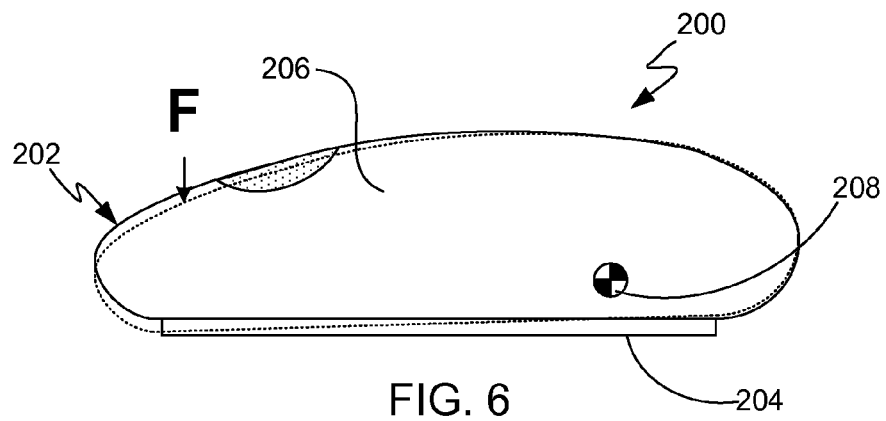
FIG. 6 is a side view of a mouse, in accordance with one embodiment of the present invention.
Figure 7:
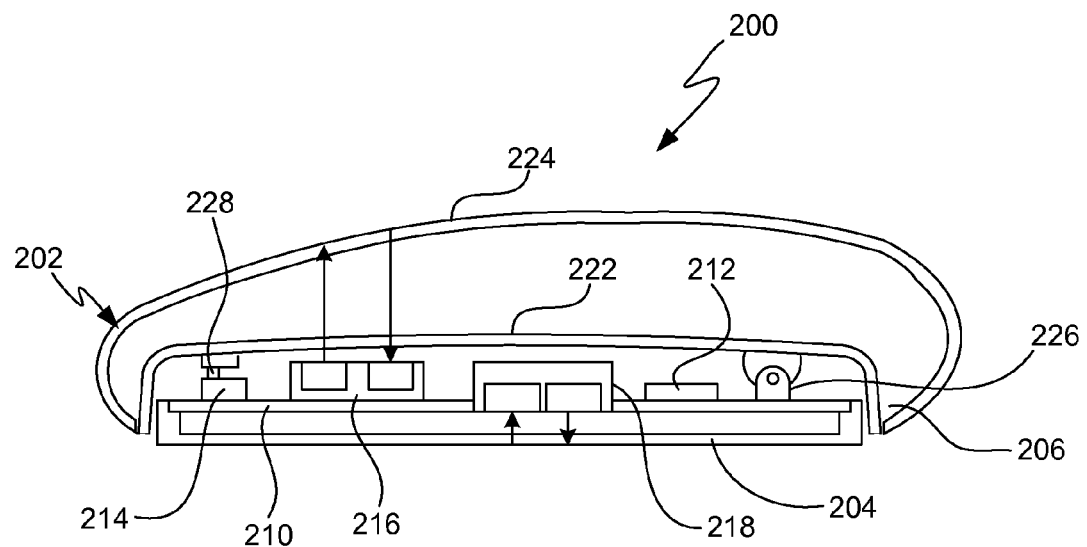
FIG. 7 is a side view, in cross section, of a mouse, in accordance with one embodiment of the present invention.

FIGS. 6 and 7 are side views of a unibody mouse 200, in accordance with one embodiment of the present invention. FIG. 7 is a cross sectional diagram of the mouse shown in FIG. 6. By way of example, the unibody mouse 200 may correspond to any of the device shown herein. The unibody mouse 200 generally includes a mouse housing 202 that provides a structure for moving the mouse along a surface, for gripping the mouse for movement thereof and for implementing at least one button function of the mouse 200. The term "unibody" herein refers to a mouse that integrates at least one button function directly into the mouse housing 202, i.e., pressing on the mouse housing 202 creates a clicking action. As such, any part of the hand, from finger to thumb to palm, can trigger a clicking action.

In one embodiment, the mouse housing 202 includes a base 204 and a button body 206. The base 204 is configured to moveably support the mouse 200 during use thereof, i.e., the base 204 makes moving contact with a surface such as a desktop or mouse pad. The button body 206, on the other hand, is configured to move relative to the base 204 so as to provide the clicking action, i.e., the entire surface of the body 206 above the base 204 acts as a single button. In the illustrated embodiment, the button body 206 is pivotable relative to the base 204, as for example, about pivot axis 208. As such, the body 206 is capable of moving between an unactuated position (shown by a solid line) and an actuated position (shown by a dotted line) when a force F is applied to the body 206. The force F may be any downward force on the mouse 200, whether from a finger, palm or hand that results in a clicking action.

The clicking action generally allows a user to perform an action on a display screen, as for example, making a selection in a GUI. For example, the clicking action may be used to implement a single click, a double click and/or a dragging and dropping function. As is generally well known, a single click often selects an item on the screen, a double click often opens a document or starts a program, and dragging and dropping generally makes it easy to move an item on the screen. In order to perform a single click using the mouse 200, the user presses and releases the body 206. In order to perform a double click using the mouse 200, the user quickly presses and releases the body 206 twice. In order to perform a drag and drop function, the user first positions the pointer or cursor over an item on the screen (by moving the mouse along the flat surface) and presses and holds down the body 206 so as to select the item. Thereafter, the user, while still holding down the body 206, moves the pointer to a desired position on the screen (by moving the mouse along the flat surface) and subsequently releases the body 206.

Referring to FIG. 7, the base 204 and button body 206 provide the mouse housing 202 for containing the electronics that generate control signals associated with controlling cursor movements, scrolling and performing actions on a display screen. By way of example, the electronics may include printed circuit boards (PCB) 210, processors 212, switches 214, position detection mechanisms 216 and 218, and the like. The base 204 and body 206 may also define the shape or form of the mouse 200. In the illustrated embodiment, a bottom side of the base 204 has an external contour (e.g., rectilinear) that substantially conforms to the contour of a flat surface such as a desktop and a top side of the mouse housing 202 has an external contour that substantially conforms to the contour of the inside surface of a hand (e.g., curved). As shown, the button body 206 represents a substantial portion of the entire mouse housing 202.

More specifically, the body 206 includes an inner shell 222 and an outer shell 224. The outer shell 224 is structurally coupled to the inner shell 222. The means for coupling the outer shell 224 to the inner shell 222 is not shown herein, however, any suitable coupling means may be used. By way of example, the outer shell 224 may be coupled to the inner shell 22 2 via fasteners such as snaps, screws, glues and the like. Alternatively, the inner and outer shell 222, 224 may be integrally formed from a single piece of material. The inner and outer shells 222, 224, as well as the base 204, are generally formed from a suitable material such as plastic. In one implementation, the inner and outer shell 224 are formed from an optically transmissive material. As shown, the inner shell 222 is disposed between the base 204 and the outer shell 224. In one embodiment, the inner shell 222 is configured to cover the electronic components disposed on the PCB 210.

The inner shell 222 is pivotally coupled to the base 204 via a pivot 226 located towards the rear of the mouse 200. By way of example, the pivot 226 may include a pivot support attached to the base 204, and the inner shell 222 may include an internal pivot pin for mating with an opening in the pivot support. The pivot 226 allows the body 204 to swing between an unclicked position, placing the body 206 away from the base 204, and a clicked position, placing the body 206 towards the base 204. In the clicked position (e.g., when a downward force is applied to the body 204), the inner shell 222 is configured to engage the switch 214, which is mounted on the PCB 210 and which is located opposite the pivot 226. That is, during the clicking action, a bottom portion of the inner shell 222 is pushed against an actuator 228 of the switch 214 thereby activating the switch 214, i.e., the actuator 228 is configured to move between a deactivate position (e.g., upright) and an activate position (e.g., depressed). When activated, a command signal such as a data selection or execution command signal is sent to a computer. By way of example, the signal may be sent through a cable (not shown) that is connected to the internal electronics housed within the mouse 200. In one embodiment, a spring mechanism is used to bias the inner shell 222 in a direction away from the base 204, i.e., in the un-clicked position (as shown). By way of example, the spring mechanism may be part of the switch 214, i.e., the actuator 228 may be biased in the upright position, or it may be a separate spring pad connected to the base 204.

Also mounted on the PCB 210, are the first position detection mechanism 216 and the second position detection mechanism 218. The first position detection mechanism 216 is configured to track (as shown by arrows) the position of a finger moving across the mouse 200 (e.g., outer shell 224). The second position mechanism 218 is configured to track the position of the mouse 200 (e.g., base 204) moving across a surface. Each of the position detection mechanisms produces a separate positional signal for making movements on a display screen. The movements may be widely varied. For example, the movements may correspond to cursor movements, scrolling movements, panning movements and the like. In the illustrated embodiment, the first position detection 216 is configured to implement scrolling when a finger is moved across the mouse 200, and the second position mechanism 218 is configured to move a cursor when the mouse 200 is moved along a surface. The position detection mechanisms may be widely varied. For example, the position detecting mechanisms may be a mechanical mechanism such as a trackball or an optical mechanism such as an optical sensor. In the illustrated embodiment, the first and second position detection mechanisms 216, 218 are optical sensor arrangements. As shown, the optically transmissive inner and outer shells 222, 224 allow the optical sensors of the first position mechanism 216 to work therethrough. Alternatively, the first position detection mechanism 216 may be located above the inner shell 222, between the inner shell 222 and the outer shell 224. In cases such as these, the inner shell 222 may be formed from an opaque material.

In one embodiment, the first position mechanism 216 is dedicated to controlling a first GUI movement and the second position detection mechanism 218 is dedicated to controlling a second GUI movement that is different than the first GUI movement. For example, the first position detection mechanism 216 may be dedicated to controlling a scrolling or panning feature and the second position detection mechanism 218 may be dedicated to controlling movements of a cursor.

Accordingly, the user may move the mouse 200 to move the cursor and move his or her finger to scroll on a display screen.

Although not shown, the switch 214, and position detection mechanisms 216, 218 are operatively coupled to the processor 212. The processor 212 generally provides control functions for the mouse 200. For example, the processor 212 may be used to interpret data gathered from the switch 214 and position detection mechanisms 216, 218. The processor 212 may also be used to transmit the results of the data to a host device. For example, the first position detection mechanism 216 via the optical sensor may detect finger movement, and send electrical signal to the processor 212, and the processor 212 may send out the movement information to a host system.

Figure 8:
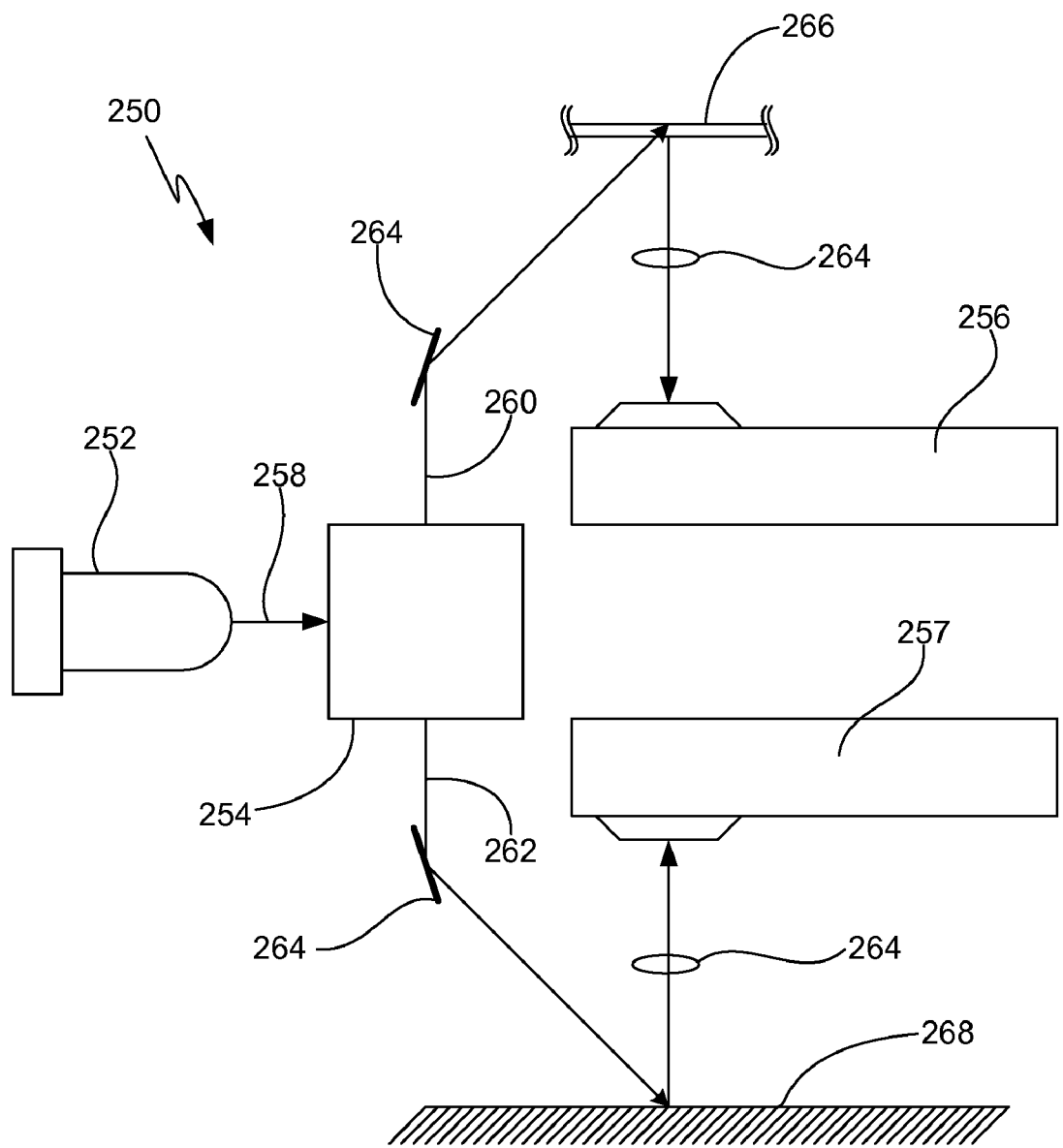
FIG. 8 is a simplified diagram of a dual position detection mechanism, in accordance with one embodiment of the present invention.

FIG. 8 is a simplified block diagram of a dual position detection mechanism 250, in accordance with one embodiment of the present invention. As shown, the dual position detection mechanism 250 includes a single light source 252, a beam splitter system 254 and a pair of optical sensors 256, 257. In this embodiment, the light 258 from the light source is split into multiple beams 260, 262 via the beam splitter arrangement 254. Each of the split beams 260, 262 is used with one of the distinct optical sensors 256, 257. That is, the light 258 entering the beam splitter arrangement 254 is split into two distinct beams 260, 262. Each of these beams follows a different optical path corresponding to each of the optical sensors 256, 257. For example, the first optical path may correspond to the first optical sensor 256, and the second optical path may correspond to the second optical sensor 257. In one embodiment, the light source is an LED and the optical sensors are image acquisition sensors such as CMOS image sensors. The beam splitter arrangement may be widely varied. In general, its any optical component (or components) that can split a single beam into two distinct beams. For example, the beam splitter arrangement may include a beam splitter cube, diffraction grating or the like, as well as other optical components for splitting the beam. The dual position detection mechanism 250 may also include other optical components 264 for directing each of the split beams 260, 262 to a desired area. By way of example, light conduits such as light pipes or light guides may be used. In one embodiment, the first optical sensor 256 is configured to detect finger positions relative to an operable optical window 266, and the second optical sensor 257 is configured to detect device positions relative to a surface 268, as for example, the configuration shown in FIGS. 6 and 7.

It should be noted that the position detection mechanism shown in FIG. 8 is not a limitation and that more than two beams may be split away from a single beam.

The advantages of the invention are numerous. Different embodiments or implementations may have one or more of the following advantages. One advantage of the invention is that it requires no obvious button to actuate a GUI movement. Buttons break the surface of the housing and are therefore less aesthetically pleasing. For example, there is no need for a cutout at the housing nor a mechanical component to protrude out of the device. Another advantage of the invention is that the user implements the GUI movements by a simple and natural posture change of the hand and is not required to hold down a button. For example, the invention provides scrolling with very little force (almost zero) exerted by the finger on the scroll area of the device. In contrast, convention devices have mechanical components that require some amount of force to be applied by the finger, as for example, in the form of a pushing action to rotate a wheel or to activate a switch. Another advantage of the invention is that it allows an intuitive way to scroll on a display screen. For example, the user can manipulate his or her finger side to side for horizontal scrolling and backwards/forwards for vertical scrolling.

While this invention has been described in terms of several preferred embodiments, there are alterations, permutations, and equivalents, which fall within the scope of this invention. For example, a switch may be provided to activate the optical touch pad and deactivate the second position detection mechanism (or vice versa) so that scrolling and cursor movements are not active simultaneously. The switch may be a separate switch, or it may be built into the two devices, i.e., activates which ever mechanism is being used, if both are being used only activates the one that was initiated first. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A mouse, comprising:
   a housing having a generally flat bottom surface and a generally curved top surface, the generally curved top surface having a contour that substantially conforms to the contour of the inside of a hand;
   a finger actuated scrolling region integrated into the top surface of the housing; and
   an optical system disposed inside the housing and configured to detect finger movement across the scrolling region, wherein the finger actuated scrolling region represents a working area of the optical system.

2. A mouse, comprising:
   a housing;
   a finger actuated scrolling region integrated into the housing; and
   an optical system disposed inside the housing and configured to detect finger movement across the scrolling region, wherein the finger actuated scrolling region represents a working area of the optical system;
   wherein the scrolling region comprises an optically operable window carried by the housing of the mouse, such that the optical system is further configured to work through the optically operable window so as to detect movements of a finger in close proximity to and moving across the optically operable window in order to detect the finger movement across the scrolling region,
   wherein the optical system further comprises one or more light sources and one or more optical sensors for detecting movements of a finger in close proximity to and moving across the optically operable window by receiving light reflected directly from the finger through the optically operable window.

3. The mouse, as recited in claim 2, wherein the one or more light sources are a light emitter configured to shine light towards the optically operable window, and the one or more optical sensors are light detectors configured to measure the light intensity of the light that is reflected off an object located at the optically operable window.

4. The mouse, as recited in claim 2, wherein the scrolling region further comprises an optical touch pad configured to translate finger motion into scrolling movements.

5. The mouse, as recited in claim 2, further comprising:
   a light guide that directs light from the one or more light sources to the housing at the scrolling region; and
   a lens that helps direct light from the housing at the scrolling region to the optical sensors.

6. The mouse, as recited in claim 2, wherein the housing of the mouse is formed from an optically transmissive material.

7. The mouse, as recited in claim 2, wherein the housing of the mouse is formed from a translucent material.

8. The mouse, as recited in claim 2, further comprising:
a controller coupled to the one or more optical sensors configured to interpret data collected by the one or more optical sensors and reports this information to a host system.

9. The mouse, as recited in claim 2, further comprising:
a position detection mechanism carried by the housing of the mouse and configured to translate finger motion and/or housing motion into movements on a display coupled to the mouse.

10. The mouse, as recited in claim 9, wherein the movements controlled by the finger motion are different than the movements controlled by the housing motion.

11. The mouse, as recited in claim 10, wherein the movements controlled by the finger motion correspond to scrolling movements and wherein the movements controlled by the housing motion correspond to cursor movements.

12. The mouse, as recited in claim 1, further comprising:
an audio feedback device that provides audio feedback to a user of the mouse at a rate at which an object is moved across the optically operable window.

13. The mouse, as recited in claim 1, wherein the optically operable window is located above a printed circuit board enclosed within the housing of the mouse, and the one or more light sources and optical sensors are mounted on the printed circuit board.

14. The mouse, as recited in claim 13, wherein at least one of the one or more light sources and optical sensors is mounted on a bottom side of the printed circuit board, and the printed circuit board includes one or more openings through which the at least one of the one or more light sources and optical sensors optically communicate with a surface outside the housing.

15. The mouse, as recited in claim 1, wherein the optical system is further configured to work through the window.

16. The mouse, as recited in claim 15, wherein the optical system is further configured so as to detect finger movement across the window.

17. The mouse, as recited in claim 1, further comprising:
a first position detection mechanism carried by the housing of the mouse and configured to translate the finger motion into scrolling movements.

18. The mouse, as recited in claim 17, further comprising a second position detection mechanism configured to translate housing motion into cursor movements.

19. The mouse, as recited in claim 1, wherein the mouse further comprises a second optical system configured to detect movement of the mouse across a surface.

20. The mouse, as recited in claim 19, wherein the mouse further comprises a single light source, a beam splitter system, and a pair of optical sensors.

21. The mouse as recited in claim 1,
wherein vertical scrolling is implemented when a finger is moved along a first direction and horizontal scrolling in implemented when the finger is moved along a second direction.

22. The mouse as recited in claim 21, wherein the mouse has a longitudinal axis generally extending along the length of the mouse and a transverse axis, extending perpendicular to the longitudinal axis, and the first direction is generally along the longitudinal axis of the mouse and the second direction is generally along the transverse axis of the mouse.

23. A method comprising:
detecting finger movement across a finger actuated scrolling region integrated into a housing of a mouse, wherein the finger actuated scrolling region represents a working area of an optical system disposed within the housing of the mouse, the optical system including at least one light source and at least one light detector;
detecting movement of the mouse across a surface external to the mouse, the external surface being other than a surface immediately adjacent the finger actuated scrolling region,
translating the detected finger movement into a first movement on a display; and
translating the detected movement of the mouse across the external surface into a second movement on the display, the second movement being distinct from the first movement.

24. The method of claim 23, further comprising:
directing light from the at least one light source to the working area of the optical system; and
receiving light reflected from the working area at the at least one light detector.

25. The method of claim 24, wherein the at least one light detector comprises a plurality of light detectors, and receiving light reflected from the working area comprises
receiving reflected light at each of the plurality of light detectors.

26. The method of claim 23, further comprising:
using the at least one light source to generate a first light beam and a light second beam;
directing the first light beam onto the working area of the optical system;
directing the second light beam onto the external surface; and
using reflected light from the second light beam to detect mouse positions relative to the external surface.

27. The method of claim 26, wherein the at least one light detector comprises a first and a second light detector, the method further comprising:
receiving light of the first light beam reflected from the working area onto the first light detector; and
receiving light of the second light beam reflected from the external surface onto the second light detector.

28. The method of claim 27, wherein the at least one light source comprises a single light source, the method further comprising:
splitting light emanating from the single light source into the first and the second light beams.

29. The method of claim 27, wherein the at least one light source comprises a first and second light source, the method further comprising:
generating the first light beam using the first light source, and
generating the second light beam using the second light source.

30. A mouse, comprising:
a housing having a generally flat bottom surface and a top surface;
a finger actuated scrolling region integrated into the top surface of the housing;
an optical system disposed inside the housing and configured to detect finger movement across the scrolling region, wherein the finger actuated scrolling region represents a working area of the optical system, and
means, at least partially distinct from the optical system to detect finger movement across the scrolling region, for detecting movement of the housing across a surface external to the housing while at least a portion of the bottom surface of the housing is in contact with the external surface and the external surface is other than a surface immediately adjacent the finger actuated scrolling region.

31. The mouse as recited in 30, wherein the means for detecting comprises another optical system, the other optical system including at least some elements distinct from the optical system configured to detect finger movement across the scrolling region.

32. The mouse as recited in 30, wherein the means for detecting comprises a mechanical mechanism.

33. The mouse as recited in 32, wherein the means for detecting comprises a trackball.

34. The mouse as recited in claim 30 wherein the optical system is configured to produce a first position signal for making a first movement a on a display screen, and the detecting means is configured to produce a second position signal for making a second movement on the display screen, the second movement being distinct from the first movement.

35. A mouse, comprising:
a housing
a finger actuated scrolling region integrated into the housing; and
an optical system disposed inside the housing and configured to detect finger movement through the housing and in multiple directions across the scrolling region;
wherein vertical scrolling is implemented when a finger is moved along a first direction and horizontal scrolling in implemented when the finger is moved along a second direction.

36. The mouse as recited in claim 35, wherein the mouse has a longitudinal axis generally extending along the length of the mouse and a transverse axis, extending perpendicular to the longitudinal axis, and the first direction is generally along the longitudinal axis of the mouse and the second direction is generally along the transverse axis of the mouse.

* * * * *

UNITED STATES PATENT AND TRADEMARK OFFICE
CERTIFICATE OF CORRECTION

PATENT NO. : 8,314,773 B2  
APPLICATION NO. : 12/030776  
DATED : November 20, 2012  
INVENTOR(S) : Wing Kong Low et al.

Page 1 of 1

It is certified that error appears in the above-identified patent and that said Letters Patent is hereby corrected as shown below:

In the Claims:

At column 15, claim number 12, line 20, please delete "claim 1" and insert -- claim 2 --.

At column 15, claim number 13, line 24, please delete "claim 1" and insert -- claim 2 --.

At column 15, claim number 15, line 36, please delete "claim 1" and insert -- claim 2 --.

At column 15, claim number 17, line 41, please delete "claim 1" and insert -- claim 2 --.

At column 15, claim number 19, line 48, please delete "claim 1" and insert -- claim 2 --.

At column 15, claim number 21, line 54, please delete "claim 1" and insert -- claim 2 --.

At column 15, claim number 21, lines 56-57, please delete "scrolling in implemented" and insert -- scrolling is implemented --.

At column 17, claim number 34, line 16, please delete "movement a on a display" and insert -- movement on a display --.

At column 18, claim number 35, lines 9-10, please delete "scrolling in implemented" and insert -- scrolling is implemented --.

Signed and Sealed this  
Fourteenth Day of May, 2013

Teresa Stanek Rea  
*Acting Director of the United States Patent and Trademark Office*